United States Patent
Kobe et al.

(10) Patent No.: US 7,063,887 B2
(45) Date of Patent: Jun. 20, 2006

(54) STRETCH RELEASABLE FOAMS, ARTICLES INCLUDING SAME AND METHODS FOR THE MANUFACTURE THEREOF

(75) Inventors: James J. Kobe, Newport, MN (US); James D. LaPerre, River Falls, WI (US); Zhiming Zhou, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 161 days.

(21) Appl. No.: 10/067,047

(22) Filed: Feb. 4, 2002

(65) Prior Publication Data

US 2003/0170443 A1 Sep. 11, 2003

(51) Int. Cl.
C09J 7/02 (2006.01)
B32B 7/12 (2006.01)

(52) U.S. Cl. .............. 428/317.9; 428/317.3; 428/317.5; 428/355 RA; 428/343; 428/313.5

(58) Field of Classification Search .......... 428/317.9, 428/317.3, 317.5, 355 RA, 343, 313.5
See application file for complete search history.

(56) References Cited

U.S. PATENT DOCUMENTS

| | | | |
|---|---|---|---|
| 3,842,832 A | 10/1974 | Wideman et al. | |
| 4,024,312 A | 5/1977 | Korpman | |
| 4,310,509 A | 1/1982 | Berglund et al. | |
| 4,323,557 A | 4/1982 | Rosso et al. | |
| 4,333,449 A | 6/1982 | Muller et al. | |
| 4,472,480 A | 9/1984 | Olson | |
| 5,110,843 A * | 5/1992 | Bries et al. | 521/159 |
| 5,232,770 A * | 8/1993 | Joseph | 428/284 |
| 5,238,733 A * | 8/1993 | Joseph et al. | 428/284 |
| 5,507,464 A | 4/1996 | Hamerski et al. | |
| 5,516,581 A * | 5/1996 | Kreckel et al. | 428/317.3 |
| 5,804,610 A | 9/1998 | Hamer et al. | |
| 5,932,298 A | 8/1999 | Moon | |
| 5,989,708 A | 11/1999 | Kreckel | |
| 6,103,152 A | 8/2000 | Gehlsen et al. | |
| 6,197,397 B1 | 3/2001 | Sher et al. | |
| 6,231,962 B1 | 5/2001 | Bries et al. | |
| 6,280,840 B1 | 8/2001 | Luhmann et al. | |
| 2001/0019764 A1 | 9/2001 | Bries et al. | |
| 2002/0132115 A1* | 9/2002 | Hamerski et al. | 428/343 |

FOREIGN PATENT DOCUMENTS

DE 33 31 016 10/1984

(Continued)

OTHER PUBLICATIONS

U.S. Appl. No. 09/764,478; James J. Kobe et al.; filed Feb. 2, 2001.

(Continued)

Primary Examiner—Daniel Zirker
(74) Attorney, Agent, or Firm—David B. Patchett; Daniel R. Pastirik

(57) ABSTRACT

A foam adhesive article is provided comprising a polymeric foam material having an outer surface, the outer surface of the polymeric foam material having adhesive properties; and fibrous reinforcing material, the fibrous reinforcing material dispersed within the polymeric foam material and imparting stretch release properties to the article. A method for preparing the foam adhesive article is also described comprising (a) melt mixing a foamable polymer composition, and a fiber forming resin to form an expandable extrudable composition; and (b) extruding the expandable extrudable composition through a die to provide the foam adhesive article.

20 Claims, 3 Drawing Sheets

FOREIGN PATENT DOCUMENTS

| | | |
|---|---|---|
| DE | 196 49 728 | 6/1998 |
| EP | 0 341 875 | 11/1989 |
| WO | WO 92/11333 | 7/1992 |
| WO | WO 99/31193 | 6/1999 |
| WO | WO 01/14489 | 3/2001 |
| WO | WO 02/04571 | 1/2002 |

OTHER PUBLICATIONS

U.S. Appl. No. 09/775,955; Zhiming Zhou et al.; filed Jan. 17, 2001.

* cited by examiner

STRETCH RELEASABLE FOAMS, ARTICLES INCLUDING SAME AND METHODS FOR THE MANUFACTURE THEREOF

This invention relates to a stretch-releasable foam adhesive substrate, articles comprising the foam substrate and methods of making the stretch-releasable foam substrates and articles.

BACKGROUND OF THE INVENTION

Articles incorporating a polymer foam core are characterized by the density of the foamed polymer being lower than the density of the pre-foamed polymeric matrix. The lowered density for the foam may be achieved in several known ways such as by the use of a blowing agent to generate gas-filled voids within the matrix or by interspersing microspheres within the matrix, the microspheres typically being made of glass or of certain polymeric materials.

Articles that include polymer foams are described, for example, in U.S. Pat. No. 6,103,152 issued on Aug. 15, 2000 to Gehlsen et al. The Gehlsen '152 patent describes articles that include a polymer foam featuring a polymer matrix and one or more expandable polymer microspheres. The foam microstructure is characterized by a plurality of enlarged polymeric microspheres distributed throughout the polymer matrix. At least one of the microspheres is still expandable, i.e., upon application of heat it will expand further without breaking. The foam may be formulated with an adhesive surface and is characterized by a surface that is substantially smooth.

Any of a variety of articles can include a polymer foam core such as, for example, vibration damping articles, medical dressings, retroreflective sheeting, tapes, anti-fatigue matting, abrasive articles, gaskets, sealants, and the like. In the aerospace, electronic, and automotive industries, for example, foam core tapes may be used in the assembly and/or attachment of parts and panels. However, the foam core tape products currently available provide bonds between the attached surfaces that are more or less permanent, making it very difficult to later separate the parts and, consequently, difficult to recycle those parts. Certain regional areas, for example, Europe, require product life management, and material contamination is an issue in this regard.

Adhesive materials, including pressure sensitive adhesives, are commercially available for use in any of a variety of applications. Certain pressure sensitive adhesives comprise a fibrous reinforcing material like that described in U.S. patent application Ser. No. 09/764,478. The patent application describes the fibrous reinforcement of pressure sensitive adhesives to provide "stretch removable" characteristics. The fiber reinforced adhesive composition comprises a pressure sensitive adhesive matrix with a fibrous reinforcing material therewithin. The fiber reinforced adhesive composition is described as providing improved cohesive strength over the pressure sensitive adhesive alone, while the tack of the pressure sensitive adhesive remains substantially unreduced by the presence of the fibers.

In order to address a long felt need in the manufacture and use of adhesives, and particularly in foam core tapes, it is desirable to provide tape having strong bonding characteristics when applied to a surface. It is also desirable to provide an adhesive composition for use in a foam tape wherein the adhesive is formulated to facilitate the removal of the foam tape from the aforementioned substrate by a stretch release mechanism. The technical requirements of a foamed stretch release tape have been thought to include (1) foam split strength at least about 10 lbs/in (1.76 kN/m); (2) 90 degree peel adhesion greater than about 10 lbs/in (1.76 kN/m), (3) high tensile strength that is generally higher than the force required to remove the tape from a surface so that the tape is not broken upon stretch release; (4) mechanical properties including a low yield stress, good elongation (e.g., >200%) and (5) either have significant strain hardening behavior or high elastic recovery.

Conventional foam tapes have generally been designed to provide more permanent (e.g., not releasable) attachment systems in any of a variety of industrial applications. Hence, such attachment systems have been provided as high strength attachment systems generally incapable of being easily released from a substrate. Moreover, the high strength bonds provided by conventional foam tapes have been incompatible with the notion of formulating a foam tape that is stretch releasable along with having desirable adhesive qualities.

It would be desirable to provide stretch releasable foam core substrates, articles including such substrates (e.g., tapes), and methods for the manufacture of the articles. It is also desirable to provide these substrates using a soft pressure sensitive adhesive foam matrix that allows for energy dissipation and a high tensile strength to provide strong adhesion to any of a variety of surfaces.

SUMMARY OF THE INVENTION

In one aspect, the invention features a foam adhesive article, comprising a polymeric foam material having an outer surface, the outer surface of the polymeric foam material having adhesive properties; and fibrous reinforcing material, the fibrous reinforcing material dispersed within the polymeric foam material and imparting stretch release properties to the article. The fibrous reinforcing material may be elastic or viscoelastic.

In this aspect of the invention, the polymeric foam material may be provided as a sheet and the outer surface of the sheet comprises a first major surface and a second major surface, with a skin adhesive layer disposed on at least a portion of one of the first major surface or second major surface. A release liner may be disposed on the adhesive layer. The fibrous reinforcing material typically has an elongation at break of at least about 200%. When the fibrous reinforcing material is viscoelastic, the material comprises substantially continuous fibers having a yield strength and a tensile break strength, and wherein the tensile break strength is about 0.7 MPa or greater, and at least about 150% of the yield strength. When the fibrous reinforcing material is elastic, the material comprises substantially continuous fibers having greater than about 50% recovery after being elongated 100%. The polymeric foam material typically comprise about 80 to about 50 weight % of the foam adhesive article and the fibrous reinforcing material comprises about 20 to about 50 weight % of the foam adhesive article. Fibrous reinforcing material comprises microfiber that may have a diameter of less than about 5 micrometers and an aspect ratio of greater than about 1000. The microfibers are viscoelastic or elastic. Viscoelastic microfibers may comprise homopolymers, copolymers, terpolymers and tetrapolymers of resins selected from ethylene, propylene, butene, pentene, hexene, heptene, octene, nonene, decene and other polymers. Elastic microfibers may comprise thermoplastic elastomers selected from polyurethane and synthetic block copolymers. The foam adhesive articles may further comprise a plurality of microspheres which act as foam adhesive articles may further comprise a plurality of microspheres which act as foaming agents in the manufacture of the article and, in the foams described herein, are at least partially expanded in the finished article.

Certain terms are used herein in describing the preferred embodiment of the invention. All such terms are intended to be interpreted in a manner consistent with their usage by those skilled in the art. For convenience, by way of example and not limitation, the following meanings are set forth:

"Substantially continuous" means that for an at least 0.5 centimeter length sample of the adhesive composition taken in the machine direction, at least 50% of the fibers present in the sample are unbroken.

"Tensile break strength" is the maximum tensile strength at break when tested according to test method ASTM D 882-97 at a crosshead speed of 12 inches/minute (30 centimeters/minute).

"Stretch release" refers to the property of an adhesive article characterized in that, when the article is pulled from a surface at a rate of 30 centimeters/minute and at an angle of no greater than 45°, the article detaches from the surface of the substrate without leaving significant visible residue on the surface.

In another aspect, the invention provides a method for preparing a foam adhesive article, comprising:

(a) melt mixing a foamable polymer composition, a foaming agent, and a microfiber forming resin to form an extrudable composition; and (b) extruding the extrudable composition through a die to provide the foam adhesive article.

In this aspect of the invention, expandable microspheres may be used as the foaming agent and mixed with the foamable polymer composition and the microfiber forming resin in step (a). When included, at least a portion of the expandable microspheres expand in step (b) to expand the expandable extrudable composition and provide the foam adhesive article. In other words, the expandable microspheres act as the foaming agent for the foamable polymer composition. Alternative foaming agents such as chemical blowing agents and high pressure injected gas may be used and included in step (a).

Articles made according to the foregoing method may include stretch releasable tape. Such tapes typically have a Shore A hardness is less than 60 and are constructed to stretch release from any of a variety of surfaces such as from between a pair of rigid parts or panels. The tape may be configured to include a tab. In general, articles made according to the foregoing method are described in the first aspect of the invention.

Other features and advantages of the invention will be apparent from the following description of the preferred embodiments thereof, and from the claims.

BRIEF DESCRIPTION OF THE DRAWINGS

In describing the various features of the preferred embodiment, reference is made to the various Figures, in which like reference numerals indicate like features and wherein.

DETAILED DESCRIPTION OF THE PREFERRED EMBODIMENT

The invention provides a stretch releasable foam. The foam may be formulated in an adhesive form, or adhesive qualities may be provided by the inclusion of a skin adhesive layer associated with or applied to an outer surface of the foam, for example. The foam comprises a polymer matrix foamed during the manufacture thereof by the inclusion of a foaming agent. Expandable microspheres as well as chemical blowing agents and high pressure injectable gases and the like may be used to generate a foam product from the initial polymer materials. The outer surface of the foam may be substantially smooth or it may be patterned. The polymer foam products of the invention provide a means for attaching any of a variety of surfaces together in a manner that facilitates strong bonding between the surfaces while also providing a stretch release property so that the foam may be removed without leaving visible residue on the surfaces. It may be desirable to include a tab to facilitate removal.

Figure 1:
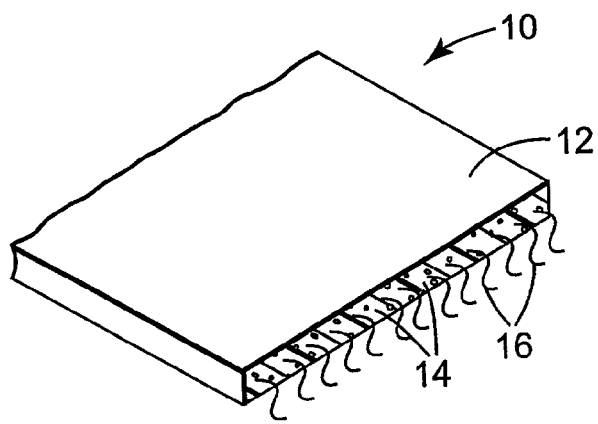
FIG. 1 is a perspective drawing showing a foam.

Turning now to the drawings, a first embodiment of a foam article according to the invention is shown in FIG. 1. The foam is in the form of a sheet 10 having a first flat surface 12 and a second surface (not shown) opposite the first surface 12. The surfaces of the foam sheet 10 may be substantially smooth as shown, or they may be provided with surface structures or the like. The foam sheet 10 comprises a polymer matrix with a plurality of expanded cells or voids 14 interspersed within the matrix. The cells or voids are a product of the foaming process and may comprise, for example, expanded polymeric microspheres. Additionally, the polymer matrix comprises a plurality of viscoelastic and/or elastic microfibers 16 oriented in the machine direction that provide the sheet 10 with stretch releasable qualities when the sheet 10 is adhered to a surface. The sheet 10 is typically provided as an adhesive article (e.g., a tape) having a surface available for bonding that may be made to be a tacky surface at room temperature (e.g., pressure sensitive adhesive articles) or as a surface that becomes tacky when heated (e.g., heat-activated adhesive articles). The foam sheet surface 12 may itself be sufficiently tacky to facilitate a suitable adhesive bond between the surface 12 and the surface of a substrate. The foam sheet 10 may also include a tab (not shown) preferably positioned such that the removal of the sheet is carried out in the same direction as the orientation of the microfibers, i.e., the machine direction.

The sheet 10 may comprise one or more additional adhesive compositions bonded to the foam in the form of an adhesive layer applied over at least a portion of the surface 12. In such a configuration, the foam itself need not be an adhesive. In this latter configuration, the sheet 10 may be adhered to the surface of a substrate by contacting the foregoing adhesive layer with the substrate to which the sheet 10 is to be bonded. The sheet 10 is an "adhesive article" in the sense that it has a surface 12 available for bonding that is either tacky at room temperature (i.e., pressure sensitive adhesive articles) or becomes tacky when heated (i.e., heat-activated adhesive articles). Adhesive articles according to the invention also include articles having a functional use, yet have the foam sheet 10 as a substrate with one or more additional structures bonded to the surface 12.

In those embodiments wherein the sheet 10 further comprises a skin adhesive layer over at least a portion of the surface 12, the adhesive may comprises any of a variety of adhesive materials as are further described herein. The skin adhesive layer can be continuous or discontinuous. Most typically, the adhesive is a pressure sensitive adhesive. A release liner may optionally be included to protect the adhesive prior to application to a substrate or the like. It will be appreciated that other layers and/or structures may be applied or affixed to at least a portion of one of the major surfaces of the sheet 10. Likewise, the sheet 10 may be provided as a two-sided tape having an adhesive layer on at least a portion of both of the major surfaces and a release liner or the like associated therewith. The adhesive layers can be the same or different compositions, can be continuous or discontinuous, and can be smooth or structured.

Any of a variety of different polymer resins, including adhesives as well as blends thereof, may be used in the formulation of a polymer matrix according to the invention. For example, thermoplastic polymers that are compatible, but immiscible with the fibrous reinforcing material. The polymer resins are typically of the type that are suitable for melt extrusion processing, as described in U.S. Pat. No. 6,103,152 (Gehlsen et al.) issued on Aug. 15, 2000, incorporated in its entirety herein by reference thereto. It may be desirable to blend two or more polymers having chemically different compositions. The physical properties of the resulting foam matrix can be optimized by varying the types of components used in creating the foam and by varying their relative concentrations. A particular resin is generally chosen or selected based upon the desired properties of the final stretch releasable foam article. General criteria in the design of an acceptable stretch release foam article include: (1) foam split strength should be greater than about 1.76 kN/m (10 lbs/inch), typically greater than about 2.64 kN/m (15 lbs/in), and often greater than 3.52 kN/m (20 lbs/in), for desired bonding performance; (2) the Shore A hardness should be less than about 60; (3) the skin adhesive, if present, should not delaminate from foam; (4) the foam article should stretch release from between a pair of rigid panels without breaking or leaving significant adhesive residue; (5) when the stretch release foam article comprises viscoelastic microfibers, the tensile break strength should be at least about 150% of the yield strength of the article with an elongation greater than about 200% and less than about 50% recovery after being elongated 100%, and when the stretch release foam article comprises elastic fibers, the foam article can have an elongation greater than about 200% and have greater than about 50% recovery after being elongated 100%; and (6) 90 degree peel adhesion to stainless steel or glass should generally be greater than about 1.76 kN/m (10 lbs/in), typically greater than about 2.64 kN/m (15 lbs/in), and often greater than 3.52 kN/m (20 lbs/in).

One group of polymers useful in the manufacture of the foams of the present invention include acrylate and methacrylate polymers and copolymers and combinations thereof. Such polymers can be formed by polymerizing one or more monomeric acrylic or methacrylic esters of nontertiary alkyl alcohols, with the alkyl groups having from 1 to 20 carbon atoms (e.g., from 3 to 18 carbon atoms). Suitable acrylate monomers include methyl acrylate, ethyl acrylate, n-butyl acrylate, lauryl acrylate, 2-ethylhexyl acrylate, cyclohexyl acrylate, iso-octyl acrylate, octadecyl acrylate, nonyl acrylate, decyl acrylate, and dodecyl acrylate. The corresponding methacrylates are useful as well. Also useful are aromatic acrylates and methacrylates, e.g., benzyl acrylate.

Optionally, one or more monoethylenically unsaturated co-monomers may be polymerized with the acrylate or methacrylate monomers. The amount of co-monomer may be based upon the desired properties of the polymer. One group of useful co-monomers includes those having a homopolymer glass transition temperature greater than the glass transition temperature of the acrylate homopolymer. Examples of suitable co-monomers falling within this group include acrylic acid, acrylamide, methacrylamide, substituted acrylamides such as N,N-dimethyl acrylamide, itaconic acid, methacrylic acid, acrylonitrile, methacrylonitrile, vinyl acetate, N-vinyl pyrrolidone, isobornyl acrylate, cyano ethyl acrylate, N-vinylcaprolactam, maleic anhydride, hydroxyalkylacrylates, N,N-dimethyl aminoethyl (meth) acrylate, N,N-diethylacrylamide, beta-carboxyethyl acrylate, vinyl esters of neodecanoic, neononanoic, neopentanoic, 2-ethylhexanoic, or propionic acids, vinylidene chloride, styrene, vinyl toluene, and alkyl vinyl ethers.

Another group of monoethylenically unsaturated co-monomers which may be polymerized with the acrylate or methacrylate monomers includes those having a homopolymer glass transition temperature less than the glass transition temperature of the acrylate homopolymer. Examples of suitable co-monomers falling within this class include ethyloxyethoxy ethyl acrylate (Tg=−71° C.) and methoxypolyethylene glycol 400 acrylate (Tg of −65° C.; available from Shin Nakamura Chemical Co., Ltd. under the designation "NK Ester AM-90G") and combinations thereof.

Another group of polymers useful for the polymer matrix of the foam includes polymers that are immiscible in, but are compatible with acrylic polymers. Examples include semi-crystalline polymer resins such as polyolefins and polyolefin copolymers (e.g., based upon monomers having between 2 and 8 carbon atoms such as low density polyethylene, high density polyethylene, polypropylene, ethylene-propylene copolymers, etc.), polyesters and co-polyesters, polyamides and co-polyamides, fluorinated homopolymers and copolymers, polyalkylene oxides (e.g., polyethylene oxide and polypropylene oxide), polyvinyl alcohol, ionomers (e.g., ethylene-methacrylic acid copolymers neutralized with base), and cellulose acetate and combinations thereof. Other examples of acrylate-insoluble polymers include amorphous polymers having a solubility parameter (as measured according to the Fedors' technique) less than 8 or greater than 11 such as polyacrylonitrile, polyvinyl chloride, thermoplastic polyurethanes, aromatic epoxies, polycarbonate, amorphous polyesters, amorphous polyamides, acrylonitrile-butadiene-styrene (ABS) copolymers, polyphenylene oxide alloys, ionomers (e.g., ethylene-methacrylic acid copolymers neutralized with salt), fluorinated elastomers, and polydimethyl siloxane and combinations thereof.

Another group of polymers useful for the polymer matrix of the foam includes thermoplastic elastomers containing ultraviolet radiation-activated groups. Examples include polybutadiene, polyisoprene, polychloroprene, random and block copolymers of styrene and dienes (e.g., SBR), and ethylene-propylene-diene monomer rubber and combinations thereof.

Another group of polymers useful for the polymer matrix of the foam includes pressure sensitive and hot melt adhesives prepared from non-photopolymerizable monomers. Such polymers can be adhesive polymers (i.e., polymers that are inherently adhesive), or polymers that are not inherently adhesive but are capable of forming pressure sensitive adhesive compositions when compounded with tackifiers. Specific examples include poly-alpha-olefins (e.g., polyoctene, polyhexene, and atactic polypropylene), tackified block copolymer-based adhesives, natural and synthetic rubbers, silicones, ethylene-vinyl acetates, polyurethanes, and epoxy-containing structural blends (e.g., epoxy-acrylate and epoxy-polyester blends) and combinations of the foregoing.

One or more expanded polymer microspheres are typically included in the polymer foam. An expandable polymeric microsphere comprises a polymer shell and a core material in the form of a gas, liquid, or combination thereof. Upon heating to a temperature at or below the melt or flow temperature of the polymeric shell, the polymer shell will expand. Examples of suitable core materials include propane, butane, pentane, isobutane, neopentane, isopentane or similar material and combinations thereof. The identity of the thermoplastic resin used for the polymer microsphere shell can influence the mechanical properties of the foam, and the properties of the foam may be adjusted by the choice of microsphere, or by using mixtures of different types of microspheres. For example, acrylonitrile-containing resins are useful where high tensile and cohesive strength are desired in a low density foam article. This is especially true where the acrylonitrile content is at least 50% by weight of the resin used in the polymer shell, generally at least 60% by weight, and typically at least 70% by weight.

Examples of suitable thermoplastic resins which may be used as the expandable microsphere shell include acrylic and methacrylic acid esters such as polyacrylate; acrylate-acrylonitrile copolymer; and methacrylate-acrylic acid copolymer. Vinylidene chloride-containing polymers such as vinylidene chloride-methacrylate copolymer, vinylidene chloride-acrylonitrile copolymer, acrylonitrile-vinylidene chloride-methacrylonitrile-methyl acrylate copolymer, and acrylonitrile-vinylidene chloride-methacrylonitrile-methyl methacrylate copolymer may also be used, but may not be desired if high strength is sought. In general, where high strength is desired, the microsphere shell will have no more than 20% by weight vinylidene chloride and typically no more than 15% by weight vinylidene chloride. High strength applications may require microspheres with essentially no vinylidene chloride. Halogen free microspheres may also be used in the foams of the invention.

As was mentioned, the foam in the articles of the invention can comprise expandable polymeric microspheres. Examples of suitable commercially available expandable polymeric microspheres include those available from Pierce Stevens (Buffalo, N.Y.) under the designations "F30D," "F80SD," and "F100D." Also suitable are expandable polymeric microspheres available from Akzo-Nobel under the designations EXPANCEL 551, EXPANCEL 461, EXPANCEL 091 and EXPANCEL 092 MB 120.

The amount of expandable microspheres is selected based upon the desired properties of the foam article. In general, the higher the microsphere concentration, the lower the density of the foam. The amount of microspheres in the polymer resin generally ranges from about 0.1 parts by weight to about 20 parts by weight (based upon 100 parts of polymer resin), typically from about 0.5 parts by weight to about 10 parts by weight, and often, from about 0.5 parts by weight to about 3 parts by weight. In general, the microsphere concentration should be sufficient to provide the desired properties of the finished foam without interfering with the formation of the microfibers, described herein, to provide the stretch release properties of the invention.

Other foaming agents useful in the invention are chemical foaming agents, and high pressure injectable gases. Examples of chemical foaming agents include water and azo-, carbonate-, and hydrazide-based molecules including, e.g., 4,4'-oxybis(benzenesulfonyl)hydrazide, such as CELOGEN OT, available from Uniroyal Chemical Company, Inc., Middlebury, Conn., 4,4'-oxybenzenesulfonyl semicarbazide, azodicarbonamide, p-toluenesulfonyl semicarbazide, barium azodicarboxylate, azodiisobutyronitrile, benzenesulfonhydrazide, trihydrazinotriazine, metal salts of azodicarboxylic acids, oxalic acid hydrazide, hydrazocarboxylates, diphenyloxide-4,4'-disulphohydrazide, tetrazole compounds, sodium bicarbonate, ammonium bicarbonate, preparations of carbonate compounds and polycarbonic acids, and mixtures of citric acid and sodium bicarbonate, N,N'-dimethyl-N,N'-dinitroso-terephthalamide, N,N'-dinitrosopentamethylenetetramine, and combinations thereof. Examples of high pressure injectable gases include nitrogen, air, carbon dioxide, and other compatible gases.

The foam may also include a number of other additives. Examples of suitable additives include tackifiers (e.g., rosin esters, terpenes, phenols, and aliphatic, aromatic, or mixtures of aliphatic and aromatic synthetic hydrocarbon resins), plasticizers, pigments, dyes, non-expandable polymeric or glass microspheres, reinforcing agents, hydrophobic or hydrophilic silica, calcium carbonate, toughening agents, antioxidants, finely ground polymeric particles such as polyester, nylon, or polypropylene, stabilizers, conductive particulates, fillers, non-polymeric fibers, fire retardants, and combinations thereof. The foregoing additional agents and components are generally added in amounts sufficient to obtain a foam material having the desired end properties, but not so as to interfere with microfiber formation described herein. Preferably, the total volume percent of all additives plus expandable microspheres is less than 50 volume percent. In addition, it is preferred that the particle size of the additive(s) is small (i.e., no greater than about 100 micrometers, typically no greater than about 10 micrometers, often no greater than about 5 micrometers, and most often no greater than about 1 micrometer) in order not to interfere with microfiber formation.

In accordance with the present invention, the foam sheet 10 includes a plurality of elastic, viscoelastic, or combination of elastic and viscoelastic microfibers 16 that reinforce the foam sheet 10 while also providing the sheet with stretch release properties. Optionally, the elastic, viscoelastic, or combination of elastic and viscoelastic microfibers may also be included in both the foam and, when present, in a skin adhesive associated with a surface of the foam. The microfibers are generated in situ from polymer resins during the manufacture of the foam. Suitable microfibers include those formulated according to the teachings of pending U.S. patent application Ser. No. 09/764,478, incorporated in its entirety herein by reference thereto.

In specific embodiments, the reinforcing microfibers are viscoelastic and comprise semi-crystalline polymers (e.g., having both amorphous and crystalline domains). Specific embodiments that incorporate semi-crystalline polymers include polycaprolactone (PCL), polybutene (PB), copolymers derived from ethylene and at least one other alpha-olefin monomer (e.g. poly(ethylene-co-1-alkene) and poly(ethylene-co-1-alkene-co-1-alkene)), ultra low density polyethylene such as is commercially available under the trade designation ATTANE 4202 from Dow Chemical Co. having a density below 0.915 grams/cubic centimeter, metallocene copolymers such as the commercially available ENGAGE series available from Dupont-Dow Elastomers, or the metallocene polyolefins such as those known under the trade designation EXACT 3024, 3040 and 3139 (available from ExxonMobil Company), linear low density polyethylene (e.g. having a density between 0.915 and 0.94 grams/cubic centimeter, such as those available from ExxonMobil Company under the designations LL-3003, ECD-125, 377D60, 369G09, 363C32, 361C33, 357C32, 350D65, 350D64, 350D60, LL-3013, and LL-3001, and the those known under the trade designation DOWLEX available from Dow Chemical Co.

In other specific embodiments, the reinforcing microfibers are elastic. Examples of suitable reinforcing microfibers that are elastic include thermoplastic elastomers such as for example those comprising polyurethane, synthetic block copolymers, and combinations of the foregoing materials.

The viscoelastic reinforcing microfiber materials will generally have a measurable yield strength. In certain embodiments, the yield strength of the reinforcing material is less than about 30 MPa. The tensile break strength of the viscoelastic reinforcing microfiber material is typically at least about 150% of its yield strength. In specific embodiments, the tensile break strength (measured according to ASTM D 882-97 at a crosshead speed of 12 inches/minute (30 centimeters/minute)) of the reinforcing microfiber material is higher than the tensile break strength of the adhesive and/or the expanded foam. Elastic reinforcing microfiber material should have greater than about 50 % recovery after being elongated 100% The reinforcing microfiber material should have a melting point above the use temperature of the adhesive composition and should have a melting point above the storage temperature of the adhesive composition or any article manufactured with the adhesive composition.

Most typically, the reinforcing microfiber material exists as substantially continuous fibers in the adhesive and/or in the foam. Specifically, according to one aspect of the invention, the microfibers are unbroken for at least about 0.5 centimeters in the machine direction of the adhesive or foam matrix, preferably at least about 2 centimeters. In other desired embodiments, the substantially continuous microfibers are continuous for at least about 5 centimeters and desirably are at least about 8 centimeters. According to another aspect of the invention, the substantially continuous microfibers generally have a maximum diameter of about 0.05 to about 5 micrometers, typically from about 0.1 to about 1 micrometer. According to another aspect of the invention, the aspect ratio (i.e. the ratio of the length to the diameter) of the substantially continuous microfibers is greater than about 1000. In general, the polymeric foam material will comprise from about 80 to about 50 weight % of the final foam adhesive article while the fibrous reinforcing material will comprise from about 20 to about 50 weight % of the final foam adhesive article. When the amount of reinforcing material comprises from about 40 to about 50 weight % of the final foam article, the foam article may have a lower foam split strength. This provides another method of removal by splitting the foam and stretch releasing each portion individually. This removal method can be advantageous when foam articles are used between two large surfaces.

It has been found that a suitable stretch release chemistry useful in the present invention comprises viscoelastic microfibers of certain homopolymers, copolymers, terpolymers, and tetrapolymers of polyalkylene resins including copolymers of polyoctene-ethylene and/or polyhexene-ethylene and the like. The microfibers will form during the manufacturing process to provide a foam and/or adhesive material that will stretch, strain-harden and release during removal from a substrate without breakage. In general, and without limitation, $C_3$–$C_{10}$ copolymers with ethylene are suitable for use in the invention. The foregoing polyoctene-ethylene and/or polyhexene-ethylene copolymers are compatible but immiscible with many acrylic and rubber/resin based block copolymer adhesives and can be blended in the twin screw extruder, as described herein, to generate the microfibers in situ.

One formulation for the foam articles of the invention comprises a 95/5 weight ratio of 2-ethylhexyl acrylate/acrylic acid; 1.0 wt. % F100D polymeric expandable microspheres based on weight of foam adhesive in the foam layer; 35 wt. % EXACT 3040 metallocene polyolefin polymer based on the weight of the total foam layer; and a skin adhesive that is a blend of acrylic adhesive and rubber based adhesive identified as Hot Melt Composition K in PCT International Publication WO 01/57152.

Figure 2:
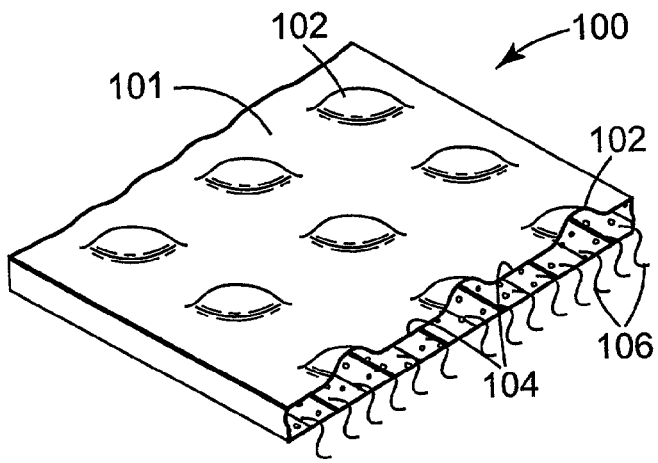
FIG. 2 is a perspective drawing showing a foam having a patterned surface.

Another embodiment of a foam substrate according to the present invention is illustrated in FIG. 2 in the form of a sheet 100 having a uniform pattern of raised portions 102 arranged on at least one surface 101 of the sheet 100. Such articles are typically prepared by differential foaming to create the raised surfaces 102 with densities different than the density of the surrounding areas 104. The polymer matrix comprises a plurality of elastic, viscoelastic, or combination of elastic and viscoelastic microfibers 106 oriented in the machine direction and embedded throughout the foam article that provide the sheet 100 with stretch release qualities. The foam may be formulated as an adhesive so that the surface 101 and the surface opposite surface 101 have the adhesive properties needed to adhere the sheet 100 to a substrate. A skin adhesive layer may be coextruded with the sheet or may be applied with an associated release liner to the surface of the sheet opposite surface 101. Such an adhesive layer and release liner are the same as those already described with respect to the article 10 of FIG. 1.

The properties of the foam articles of the invention may be adjusted by combining one or more polymer compositions with the foam. These additional compositions may take several forms, including layers, stripes, dots, etc. Foamed or non-foamed compositions may be used. A composition may be applied directly to the foam or indirectly, e.g., through a separate adhesive. In some embodiments, the additional polymer composition is removably bonded to the foam so that the additional composition can subsequently be stripped from the foam.

Figure 3:
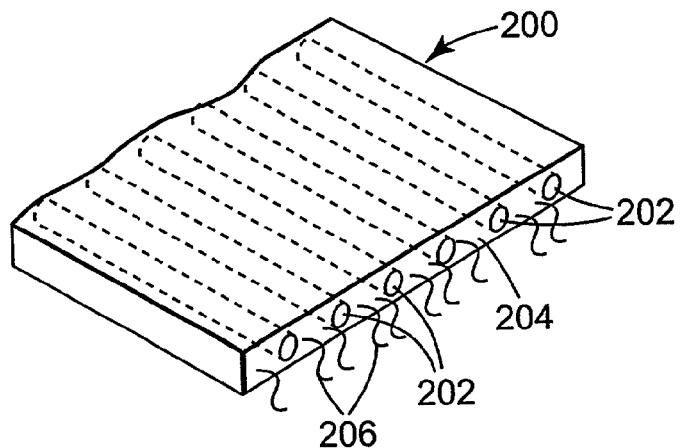
FIG. 3 is a perspective drawing of an article featuring a foam core with a plurality of foam stripes.
Figure 4:
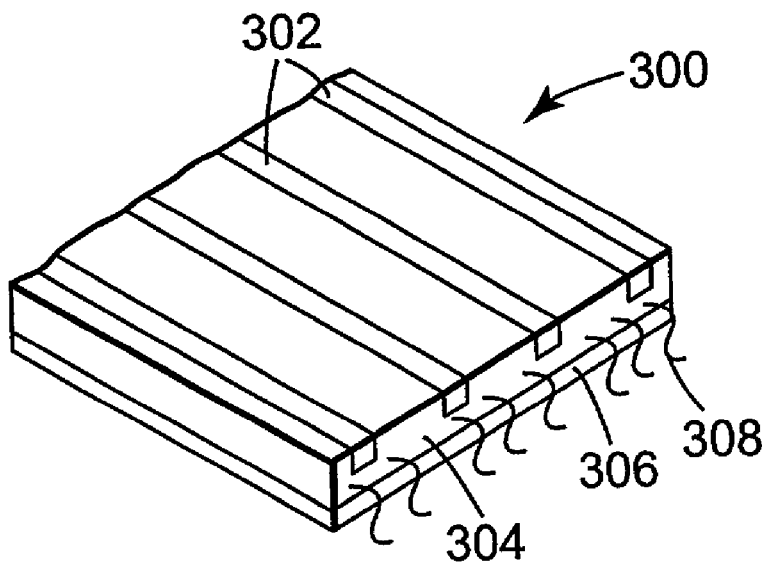
FIG. 4 is a perspective drawing of an article featuring a foam combined with a skin adhesive layer.
Figure 5:
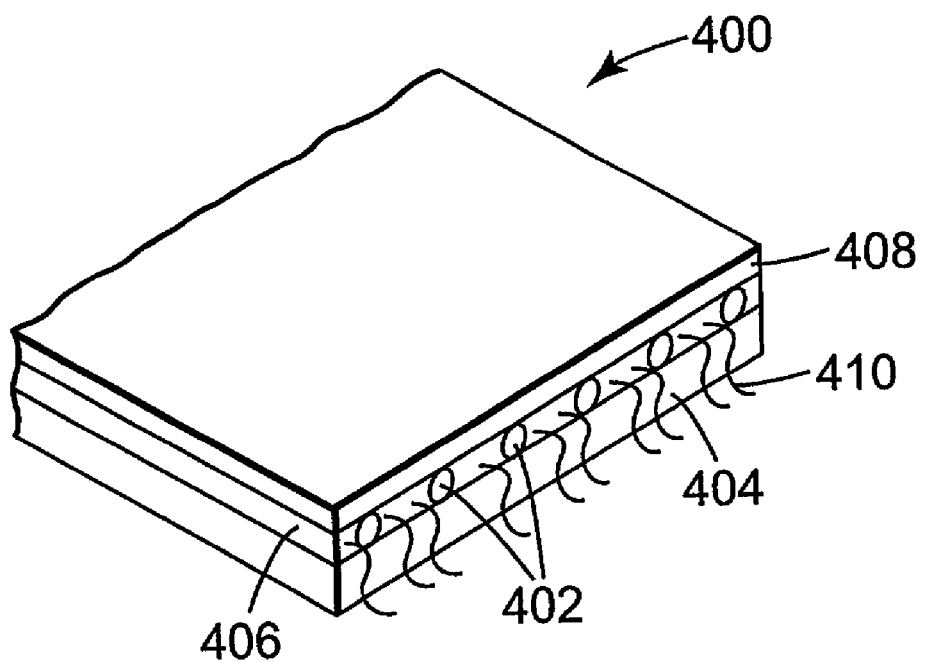
FIG. 5 is a perspective drawing of an article featuring a foam core with a plurality of foam stripes combined with multiple additional polymer compositions.

Examples of articles featuring combinations of a foam and one or more additional polymer compositions are shown in FIGS. 3–5. Referring to FIG. 3, there is shown an article 200 featuring a plurality of foam stripes 202 arranged in a patterned and combined within a separate polymer layer 204. The density of stripes 202 is different from the density of polymer layer 204 surrounding the stripes. As in the preceding embodiments, the major surfaces of the foam sheet 200 are provided with adhesive properties, either as a result of the formulation of the polymer foam sheet 200 or by providing an additional adhesive layer associated with one or both of the major surfaces of the sheet 200. A release liner may be applied to one or both of the major surfaces of the sheet 200 to cover the adhesive surface thereon until the sheet 200 is to be applied to a substrate. The foam polymer matrix comprises a plurality of elastic, viscoelastic, or combination of elastic and viscoelastic microfibers 206 that provide the sheet 200 with stretch releasable qualities when the sheet 200 is adhered to a surface.

FIG. 4 illustrates still another foam sheet article 300 according to the invention in which a plurality of foam stripes 302 are arranged in a pattern and combined within a separate polymer layer 304. Layer 304, in turn, is bonded to yet another polymer layer 306 on its opposite face. The density of stripes 302 is different from the density of layer 304 surrounding the stripes. Additionally, the polymer matrix comprises a plurality of elastic, viscoelastic, or combination of elastic and viscoelastic microfibers 308 that provide the sheet 300 with stretch releasable qualities when the sheet 300 is adhered to a surface. As in the preceding embodiments, the major surfaces of the foam sheet 300 are provided with adhesive properties, either as a result of the formulation of the polymer foam sheet 300 or by providing an additional skin adhesive layer associated with one or both of the major surfaces of the sheet 300. A release liner may be applied to one or both of the major surfaces of the sheet 300 to cover the adhesive surface thereon until the sheet 300 is to be applied to a substrate. Other layers or structures may also be adhered to the major surfaces of the sheet 300.

FIG. 5 depicts yet another foam sheet 400 in which a plurality of foam stripes 402 are embedded within a multi-layered structure featuring polymer layers 404, 406, and 408. The density of stripes 402 is different from the density of layers 404, 406, and 408. Additionally, the polymer matrix comprises a plurality of elastic, viscoelastic, or combination of elastic and viscoelastic microfibers 410 that provide the sheet 400 with stretch releasable qualities when the sheet 400 is adhered to a surface. Layers 408 and/or 404 may be formulated to provide foamed adhesive surfaces, as described with respect to the foregoing embodiments. An adhesive layer may be coextruded with the sheet or may be applied with an associated release liner to the surface of the sheet 400 either on the layer 408 or the layer 404 or on both of the layers 408 and layer 404. Such an adhesive layer and release liner are the same as those already described with respect to the article 10 of FIG. 1. Additional layers or structures may also be adhered to the major surfaces on layers 404 and 408 of the sheet 400.

Other polymer compositions may be co-extruded with the foam core such as relatively high modulus polymer compositions for stiffening the foam core (semi-crystalline polymers such as polyamides and polyesters), relatively low modulus polymer compositions for increasing the flexibility of the foam core (e.g., plasticized polyvinyl chloride), and additional foam compositions.

Figure 6:
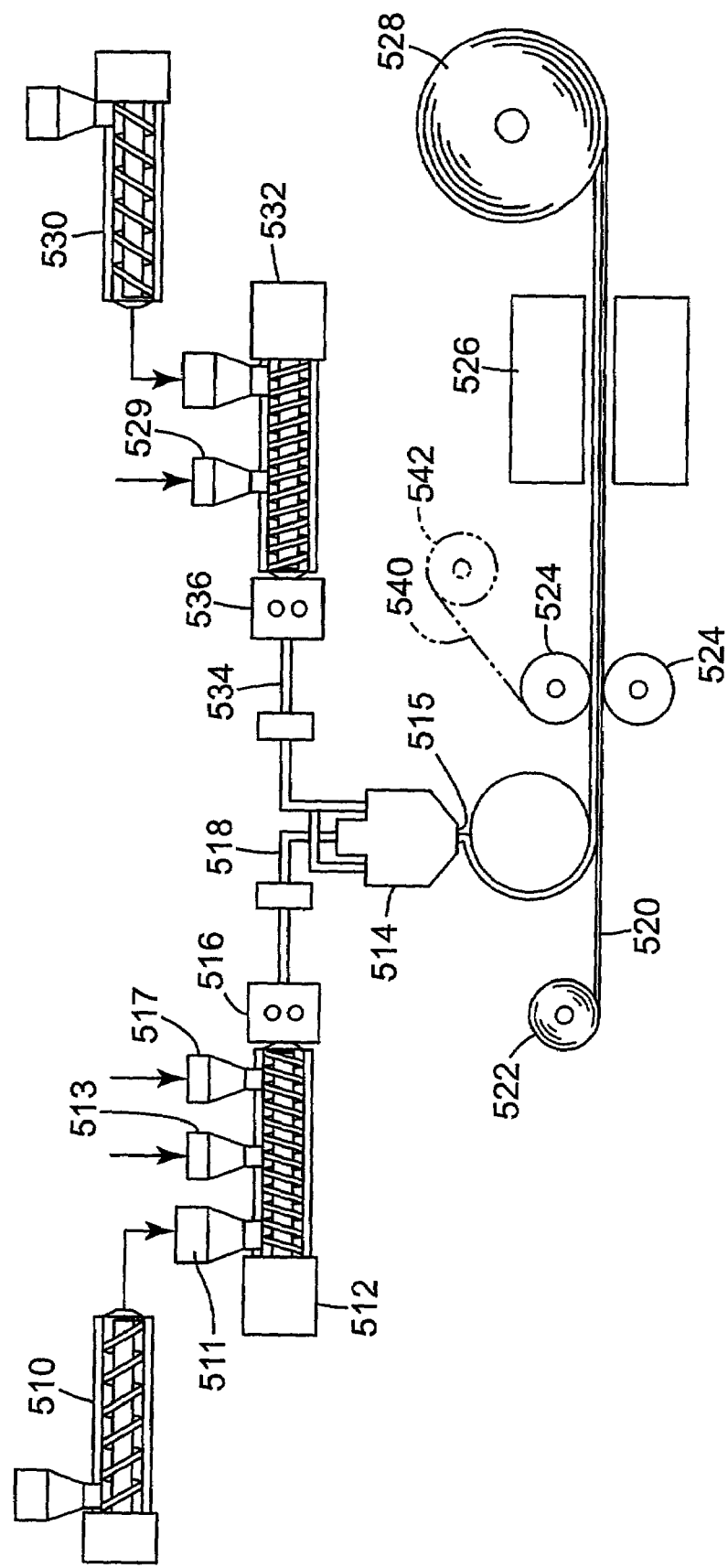
FIG. 6 is a schematic drawing of an extrusion processor for preparing articles according to the invention.

Referring to FIG. 6, an extrusion process is shown for preparing a foam article according to the invention. According to the process of the invention, polymer resin or adhesive polymer is fed into a first extruder 510 (typically a single screw extruder) to soften, grind, or melt the resin into a form suitable for extrusion. The resulting polymer resin will form the polymer matrix of the foam. The polymer resin may be added to the extruder 510 in any convenient form, such as pellets, billets, packages, strands, pouches and ropes.

Next, the polymer resin is fed to a second extruder 512 (e.g., typically a twin screw extruder). The polymer resin may be fed directly from the extruder 510 into second extruder 512 through the port 511. Other additives can be fed into any port and are typically fed into the second extruder 512 at entrance 513 and well mixed in a kneading zone before the addition of the expandable polymeric microspheres. The order of component addition and mixing conditions (e.g., screw speed, screw length, and temperature) are selected to achieve optimum mixing. Generally, mixing is carried out at a temperature below the threshold temperature required to expand the microspheres. However, temperatures higher than the microsphere expansion temperature may be used, in which case the temperature is typically decreased following mixing and prior to the addition of the microspheres to the extruder 512. Otherwise, a high extrusion pressure may be maintained during mixing of the microspheres to prevent significant pre-expansion before the die. It will be appreciated that if the polymer resin is provided in a form suitable for extrusion, the first extrusion step may be omitted and the resin added directly to extruder 512.

The expandable polymeric microspheres may be added to the second extruder 512 in a separate zone immediately prior to the last conveying zone, at downstream entrance 517 to extruder 512. Once added, the expandable polymeric microspheres and the polymer resin are melt-mixed to form an expandable extrudable composition. The appropriate resins for forming microfibers may also be added to the extruder 512 at downstream entrance 513. The melt-mixing step prepares an expandable extrudable composition in which the microspheres, microfiber forming material and other additives are distributed throughout the molten polymer resin. Typically, the melt-mixing operation uses one conveying block downstream from entrance 517 to obtain adequate mixing of the expandable polymeric microspheres. The temperature, pressure, shear rate, and mixing time employed during melt-mixing are selected to prepare an expandable extrudable composition without causing the microspheres to expand or break. Specific order of addition, zone temperatures, pressures, shear rates, and mixing times are selected based upon the particular chemical compositions being processed, and the selection of these conditions is within the skill of those practicing in the field.

When the foaming agent is a chemical blowing agent or a high pressure injectable gas, the foregoing described process is modified to accommodate the use of these foaming agents as is known by one skilled in the art.

The reinforcing microfibers are desirably formed with material having a melt viscosity (as determined with a capillary viscometer) similar to the melt viscosity of the foamable polymer material at the melt mixing temperature of the above method. The reinforcing microfiber material is selected to be immiscible in, but is compatible with the foamable polymer material. The physical properties of the stretch releasable foam are affected by how well the microfibers are formed, and the formation of the microfibers are affected by the processing conditions and compatibility with the foam core polymer resin. It is important that the melt viscosities microfiber forming resin and foam core polymer are compatible and processing conditions are right to generate continuous microfibers. The microfiber material is typically melted, mixed and dispersed in the foamable material as substantially spherical resin droplets. These droplets generally have an average diameter less than about 20 micrometers and sometimes less than about 10 micrometers.

Following melt-mixing, the resulting expandable extrudable composition is metered into an extrusion die 514 (e.g., a contact or drop die) through transfer tubing 518 using a gear pump 516. The temperature within die 514 is maintained at substantially the same temperature as the temperature within transfer tubing 518. The temperature within die 514 is at or above the temperature required to cause expansion of the expandable microspheres. While the temperature within tubing 518 will also be at or above the threshold temperature required to initiate microsphere expansion, the pressure within the transfer tubing 518 is generally high enough to prevent the microspheres from expanding. The volume within the die 514 is typically high enough to cause a pressure drop within the die 514 to a pressure below that within transfer tubing 518. When the expandable extrudable composition enters the die 514, the drop in pressure and the heat within the die 514 will cause the microspheres to begin expanding while they are within the die. In this manner, the expandable extrudable composition begins to foam. The pressure within the die 514 will continue to decrease as the expandable extrudable composition approaches the exit port 515 of the die 514. The continued decrease of pressure contributes further to the expansion of the microspheres within the die. The flow rate of the expandable extrudable composition through the extruder 512 and the die 514 are maintained to keep the pressure in the die cavity sufficiently low to promote the expansion of the microspheres before the expandable extrudable composition exits the die 514. The shape of die 514 may be chosen or fashioned to provide a desired shape for the finished foam. Any of a variety of foam shapes may be produced, including continuous or discontinuous sheets.

The manufacturing process temperatures are typically chosen so that the temperatures within each of the temperature zones is between the melting point (low limit) of elastic, viscoelastic, or combination of elastic and viscoelastic polymer resin and the activation temperature (high limit) of the foaming agent (e.g., the expandable polymeric microspheres, chemical foaming agent, etc.). Moreover, the temperature of the die 514 (FIG. 6) is generally no greater than about 60° C. over the melting point of the polymer of the microfiber so that the microfiber can effectively consolidate by crystallizing upon cooling into relatively long fibers. The melting point of polymer used in the manufacture of the microfibers herein should be lower than the activation temperature of the foaming agent used, so that the foaming agent, fiber forming polymer and the foam matrix material can be blended homogeneously without pre-expanding the foaming agent in the conveying zone. The melting point of the polymer resin used in the manufacture of the microfibers is generally at least 20° C. lower than the activation temperature of the foaming agent. Better results might be realized if the melting point of the polymer resin used to form the microfibers is at least 30° C. lower or possibly 40° C. lower than the activation temperature of the foaming agent. In addition, it is preferred that the viscosity of the fiber forming polymer at the die temperatures be similar to the viscosity of the foam matrix material to facilitate fiber formation. The physical properties of the stretch releasable foam articles of the invention can be influenced by the physical dimensions of the microfibers formed. These dimensions, in turn, are influenced by the process conditions and compatibility of the fibrous reinforcing materials with the polymeric foam material. The melt viscosities of the fibrous reinforcing material and polymeric foam material should be similar at the die temperatures and processing conditions selected to generate continuous microfibers.

If desired, the smoothness of one or both of the foam surfaces can be increased by using nip roll to press the foam against a chill roll after the foam exits die 514, or by using smooth liners on each of the foam surfaces and passing the composite article through a nip. It is also possible to emboss a pattern on one or both surfaces of the foam by contacting the foam with a patterned roll after it exits die 514 or by using a patterned or microstructured liner such as those described in U.S. Pat. No. 6,197,397 issued to Sher et al. on Mar. 6, 2001.

The extrusion process may also be used to prepare "foam-in-place" articles which find application, for example, as gaskets or other gap-sealing articles. Foam-in-place articles may be prepared by controlling the pressure and temperature within die 514 and transfer tubing 518 so that microsphere expansion does not occur to any appreciable extent. The resulting article is then placed in a desired area such as a recessed area where it is heated to a temperature sufficient to then cause expansion of the microspheres. Foam-in-place articles can also be prepared by incorporating a chemical blowing agent such as, for example, 4,4'-oxybis (benzenesulfonylhydrazide) in the expandable extrudable composition. The blowing agent can be activated subsequent to extrusion to cause further expansion, thereby allowing the article to fill the area in which it is placed.

The extrusion process can also be used to prepare patterned foams, like those shown in FIG. 2, having areas of different densities. For example, downstream of the point at which the article exits the die 514 (FIG. 6), the article can be selectively heated, e.g., using a patterned roll or infrared mask, to cause differential microsphere expansion in designated areas of the article.

In applications requiring additional layers of materials, the foam core may be combined with one or more additional layers, such as a skin adhesive layer positioned over major surfaces of the foam. FIG. 6 also shows a co-extrusion process for use in the present invention. In the depicted system, a layer of material (e.g., a skin adhesive) is first introduced to the system by adding a resin or adhesive polymer to the extruder 530 (e.g., a single screw extruder). Within the extruder 530, the material is softened, mixed, or melted and then fed to a second extruder 532 (e.g., a single or twin screw extruder). Additives such as the aforementioned microfiber resins, tackifiers, etc. may be added to the extruder 532 at downstream port 529 where the additives are mixed with the adhesive material. The number of additives, the order of their addition, and their point of addition are selected based on the adhesive formulation. The adhesive material is formulated to provide desired adhesive properties suitable for the intended application of the final product.

Following mixing, an extrudable composition is metered from the extruder 532 to the appropriate chambers of die 514 through transfer tubing 534 using a gear pump 536. The composition is co-extruded with the foam through an exit port 515 on the die 514 so that the composition is applied directly to the outer surface of the expanded foam. Where the foam is provided in a sheet form having two major outer surfaces thereon, the additional composition may be applied to the foam on either or both of the major outer surfaces. Co-extrusion methods for coating an article with adhesive are known to those in the art and are not further explained here. If the additional composition (e.g., adhesive) is to be applied to both of the two major outer foam surfaces, the resulting article is a three-layer article featuring a foam core with a skin adhesive on each of the major surfaces of the foam. For a three layer A/B/C construction (adhesive A/foam B/adhesive C) additional extruders and related equipment may be added to the system of FIG. 6 in a known manner to permit another skin adhesive to be applied to the other major surface of the foam. Alternately, the additional composition may be applied to the foam core by lamination, coating, or spraying. The skin adhesive may be continuous or discontinuous, may be the same or different composition on each surface, and may have a three dimensional surface structure. In this construction, the major surfaces of the foam may be adhered to any of a variety of surfaces for use in applications where the properties of the foam are desired and/or required. Preferably, for stretch release properties, the skin adhesive has a peel adhesion strength that is less than the tear break strength of the foam core.

Suitable skin adhesives for use in the articles of the present invention include any adhesive that provides acceptable adhesion to a variety of polar and non-polar substrates while also being compatible with the foamable composition in the manner described herein. The thickness of the skin adhesive has an effect on peel adhesion. Consequently, the thickness of the skin adhesive should be at least about 0.025 mm (1 mil), and typically, at least about 0.051 mm (2 mils). For clean removability of the stretch release article in one step, it is preferred that the skin adhesive not adhere too strongly to a substrate, i.e., have a 90 degree peel adhesion less than about 7 kN/m (40 lbs/in), preferably less than about 5.3 kN/m (30 lbs/in) and more preferably less than about 4.4 kN/m (25 lbs/in). For removability of the stretch release article in instances where the skin adhesive can develop a nearly permanent bond to a substrate, in particular a high surface energy substrate, removability can be achieved by the separation of the foamed polymer matrix from the skin adhesive. The skin adhesive will remain on the substrate and may be removed in a second operation. Pressure sensitive adhesives are generally acceptable and may be desired. Suitable pressure sensitive adhesives include any of a variety of adhesives such as those based on acrylic adhesives, polyurethanes, thermoplastic elastomers such as styrene-isoprene-styrene, styrene-butadiene-styrene, and combinations thereof, and other block copolymers, polyolefins such as poly-alpha-olefins and amorphous polyolefins, silicones, rubber based adhesives (including natural rubber, polyisoprene, polyisobutylene, butyl rubber etc.) and combinations and blends of the foregoing adhesives. The adhesive component may contain tackifiers, plasticizers, rheology modifiers, fillers, non-polymeric fibers, crosslinking agents, ceramic microspheres, glass microspheres, conductive particulates, antioxidants, dyes, pigments, stabilizers, surfactants and other additives as well as active components such as an antimicrobial agent or the like. A group of pressure sensitive adhesives known to be useful in the present invention are, for example, the acrylate copolymers described in U.S. Pat. No. RE. 24,906, and particularly a copolymer comprising a weight ratio of from about 90:10 to about 98:2 iso-octyl acrylate:acylic acid copolymer and a copolymer comprising a weight ratio of from about 90:10 to about 98:2 2-ethylhexyl acrylate:acylic acid copolymer. Also acceptable is an 65:35 2-ethylhexyl acrylate:isobornyl acrylate copolymer. Useful adhesives are described in U.S. Pat. Nos. 5,804,610 and 5,932,298, both of which are incorporated herein in their entireties by reference thereto. The inclusion of antimicrobial agents in the adhesive is also contemplated, such as is described in U.S. Pat. Nos. 4,310,509 and 4,323,557 both of which are incorporated herein in their entireties by reference thereto.

A release liner 520 may be applied to the foam adhesive or to the skin adhesive layer or layers associated with either or both of the major surfaces of the foam. A release liner 520 can be dispensed from a feed roll 522 and applied to a surface of the foam or to the skin adhesive associated with the foam. Suitable materials for liner 520 include silicone release liners, polyester films (e.g., polyethylene terephthalate films), and polyolefin films (e.g., polyethylene films). The liner and the foam are laminated together between nip rollers 524. A second optional release liner 540 may be applied to the other major surface of the extruded foam. The liner 540 may be dispensed from a second feed roll 542 which feed the liner 540 to the nip roll 524. The liner is then applied to the extruded foam or skin adhesive layer as the foam enters between the nip rolls 524. The pressure from the nip rolls 524 serves to laminate the release liners 520 and 540 to the extruded foam. Moreover, the second release liner 540 may be provided with a layer of an adhesive coated or applied to one surface of the release liner 540. In this manner, a second adhesive layer (not shown) may be applied to the second major surface of the foam material. The second adhesive layer may be the same as or different from the aforementioned co-extruded adhesive. Typically, the adhesive layers will comprise pressure sensitive adhesives. Release liner 520 may also be provided with a layer of an adhesive coated or applied to one of its surfaces.

Following lamination between the nip rolls 524, the extruded foam is optionally exposed to radiation from an electron beam source 526 to crosslink the foam for improved cohesive strength. Other sources of radiation (e.g., ion beam, gamma radiation, and ultraviolet radiation) may be used as long as the radiation is energetic enough to penetrate the thickness of the foam to initiate and complete the crosslinking reaction. As known by those skilled in the art, the extruded foam may be of a thickness that irradiation or e-beam exposure is needed on both sides of the foam for adequate crosslinking. Following exposure to e-beam or other radiation source, the resulting laminate is rolled up onto a take-up roll 528. Optionally, the foam can be wound into a roll and subsequently irradiated.

The release liners are typically coated with release agents such as fluorochemicals or silicones. For example, U.S. Pat. No. 4,472,480 describes low surface energy perfluorochemical liners. Suitable release liners include papers, polyolefin films, or polyester films coated with silicone release materials. Examples of commercially available silicone coated release liners are POLYSLIK™ silicone release papers available from James River Co., H. P. Smith Division (Bedford Park, Ill.) and silicone release papers supplied by DCP-Lohja (Dixon, Ill.) now known as Loparex Inc. (Willobrook, Ill.). A particular release liner is that known by the designation 1-60BKG-157, a super calendared Kraft paper with a water-based silicone release surface, available from Daubert Chemical Co. Other types of stable, contaminent free, release liners are also useful in the invention such as those described in U.S. patent application Ser. No. 09/775,955 incorporated herein by reference.

The foregoing co-extrusion process can be conducted so that a two-layer article is produced, or so that articles having three or more layers are produced. Such multi-layered constructions can be accomplished by equipping die 514 with an appropriate feed block, or by using a multi-vaned or multi-manifold die. Multilayered foam articles can also be prepared by laminating, coating, or spraying additional polymer layers to the foam core, or to any of the co-extruded polymer layers after the foam-containing article exits die 514. For example, the foam layer can be coated directly onto an adhesive coated release liner. Other techniques which can be used include pattern coating. The foam article may also be subjected to post-processing steps such as die-cutting, heating to promote further expansion of the article, incorporating additional layers, and the like.

The foam-containing articles are useful in a variety of applications, including aerospace, electronic, automotive, and medical applications. The properties of the articles may be tailored to meet the demands of the desired applications. Specific examples of applications include removable labels, vibration damping articles, cushioning articles, sound deadening articles, assemblies, medical dressings, tapes, retroreflective sheet backings, anti-fatigue mats, abrasive article backings, gaskets, and sealants. They can also be used as attachment systems for or as a means for mounting a wide variety of articles such as signage, reclosable fasteners, body side molding, panels, hooks, clips, and the like. Additional applications include closure applications such as container closures, diaper closures, and surgical drape closures. When the article is a tape, it is preferred that the tape is configured to include a tab which can be adhered to the foam by means of the skin adhesive layer or may be an integral part of the tape. Alternatively, a tab may be added by the end user. When the tape comprises viscoelastic microfibers, the tape can be employed as a tamper-indicating tape.

The features of the embodiments of the invention are further illustrated in the following non-limiting examples.

EXAMPLES

All amounts listed in the Examples are by weight unless otherwise specified. In the test methods and examples below, all the sample dimensions (typically the length) are approximate dimensions except for the width wherein the width was measured to the accuracy of the cutting tool.

TEST METHODS

90 Degree Peel Adhesion Test

A 25.4 mm (one inch) wide by about 152 mm (6 inches) long sample was cut from the article to be tested and laminated to an about 165 mm (6.5 inches) long by about 28.6 mm (1.125 inches) wide by 0.127 mm (0.005 inches) thick anodized aluminum foil by rolling down the article onto the anodized side of the aluminum foil, taking care not to trap air bubbles between the foil and the article. The foil/article laminate was then positioned on a clean, dry, 51 mm (two inches) wide by about 127 mm (5 inches) long, substrate panel of glass or stainless steel, as specified in the Examples below, so that the laminate was centered on the panel and a portion of the laminate extended off the panel to serve as a tab. The laminate was rolled down onto the panel using a 2 kg (4.5 lb) hard rubber roller, with two passes in each direction. Care was taken not to trap bubbles between the panel and the laminate. The sample thus prepared was allowed to dwell at room temperature (about 22° C.) for about 72 to about 96 hours. Then the sample was tested at room temperature (about 22° C.) for 90 Degree Peel Adhesion according to the Pressure Sensitive Tape Council test method PSTC-5 "Quick Stick of Pressure Sensitive Tapes" at crosshead speed of 30 cm/minute (12 inches/minute) using an INSTRON tensile tester. That is, the peel values obtained from the first 25.4 mm (one inch) length of peel were ignored. The peel value of the next 89 mm (3.5 inches) or "peel area" was recorded. The values reported were the integrated peel adhesion values. Failure mode and where visible, the percent contact area or wet-out were also noted.

Foam Split Strength Test

Foam Split Strength was determined using the procedure outlined for 90 Degree Peel Adhesion except that the substrate panel used was 1.52 mm (0.060 inch) thick anodized aluminum. The values reported were the integrated peel adhesion values. Failure mode was also noted.

Tensile Break Strength & Elongation (at Break) Test

A silicone release liner was applied to the non-liner side of the article. A 1.27 cm (0.5 inch) wide by about 12.7 cm (5 inches) long sample was cut in the machine direction from the article to be tested to form the test specimen. One liner was removed and a 5.1 cm (2 inches) length was measured and marked in the center of test specimen to provide the initial gap distance. A 2.54 cm (1 inch) wide by about 7.62 cm (3 inch) piece of masking tape was placed across the foam article by positioning the tape edge on the both marks so that the 5.1 cm (2 inches) long section that was marked off did not have tape covering it. The other liner was then removed and masking tape was wrapped completely around the article, making sure to keep the masking tape aligned across the article. The tape was used to prevent the sample from adhering to the INSTRON jaws and prevent the sample from breaking at the point where it was clamped by the jaws. The INSTRON was set up with the following conditions:

Jaw Gap: 5.1 cm (2 inches)

Crosshead Speed: 30.48 cm/minute (12 inches/minute)

The test specimen was then positioned in the INSTRON jaws so that the jaws lined up with the edge of the masking tape. The sample was tested at a crosshead speed of 30.5 cm/minute (12 inches/minute) until the sample broke. The tensile break strength was recorded in pounds (and later converted to kilograms) and elongation distance was recorded. The percent elongation at break was determined by dividing the elongation distance by the initial gap distance times 100. Three specimens were tested and averaged to provide the Tensile Break Strength and Percent Elongation.

Yield Strength Test

This test method is based on ASTM D 882-97 "Standard Test Method for Tensile Properties of Thin Plastic Sheeting".

Yield strength was determined by estimating the tensile force at the endpoint of the linear portion of a load-extension (Stress-Strain curve) obtained from data generated during the Tensile Break Strength test. The (endpoint value×2) was equal to the tensile force at yield. The yield strength was then calculated using the following formula $$\text{yield strength (psi)} = \frac{\text{tensile force at yield point (lbs)}}{\text{pre-stretch sample cross sectional area (sq. inches)}}$$

and converted to megapascals (MPa).

Modulus Test

Elastic modulus was calculated by a computer program based on the Stress-Strain curve obtained from data generated during the Tensile Break Strength test. The computer program determined the tangent to the linear portion of the Stress-Strain curve, selected a point on this tangent, and divided the tensile strength at the selected point by the corresponding strain.

The result was expressed as pounds per square inch (psi) and converted to megapascals (MPa).

Hardness Test

The thickness of an about 5.1 cm (two inches) by 2.54 cm (one inch) article sample was measured and recorded. The sample was then laminated to a clean, dry glass panel taking care to avoid trapping air bubbles between the sample and the glass. Additional pieces of article sample were laminated to the first article until a total thickness of at least 0.34 cm (0.135 inches) was achieved. Using a Shore A Hardness Tester (Model CV Stand and Durometer Type A ASTM D2240 Gauge available from Shore Instrument Mfg. Co. Inc., Freeport, N.Y.), the initial hardness of the article was measured three times and the maximum hardness values obtained were averaged.

Stretch Release Test

Two 12.5 mm (0.5 inch) wide by 76.2 mm (3 inch) long strips were cut from the test sample such that the length was cut in the machine direction of the sample.

One strip was laminated to a 50.8 mm (2 inch) wide×127 mm (5 inches) long×4.76 mm (3/16 inches) thick clear acrylic panel such that the strip was centered down the middle of the panel and approximately 25.4 mm (1 inch) of the strip extends beyond the end of the panel. Care was taken to ensure maximum wet-out of or contact between the strip and the panel. It was desired that 100% contact be achieved.

Similarly, the second strip was laminated to the other end of the acrylic panel. Then a second acrylic panel directly over the first acrylic panel making sure not to entrap air bubbles between the strips and the second panel. The bonded sample was allowed to dwell for between 24 and 72 hours at room temperature (about 22° C.).

The free end of the test strips were pulled by hand at a speed of about 30 cm/minute (about 12 inches/minute) in a direction substantially parallel to the panels to initiate stretch release removal until the bond failed. The panels were then visually examined for the presence of residue and the failure mode was recorded.

Preparation of Packaged Pressure Sensitive Adhesive A:

A pressure-sensitive adhesive composition was prepared by mixing 90 parts of 2-ethylhexyl acrylate (2-EHA), 10 parts of acrylic acid (AA), 0.15 part IRGACURE 651 and 0.03 parts isooctyl thioglycolate (IOTG). The composition was placed into packages measuring approximately 10 cm by 5 cm by 0.5 cm thick packages as described in U.S. Pat. No. 5,804,610 (Hamer et al). The packaging film was 0.0635 thick VA-24 Film (ethylene vinyl acetate copolymer available from CT Film of Dallas, Tex.). The packages were immersed in a water bath and at the same time exposed to ultraviolet radiation at an intensity of 3.5 milliwatts per square centimeter and a total energy of 1627 milliJoules per square centimeter as measured by NIST units to form "Packaged Pressure Sensitive Adhesive A".

Preparation of Precompounded Skin Adhesive A:

A skin adhesive was precompounded from "Packaged Pressure Sensitive Adhesive A" as follows:

The "Packaged Pressure Sensitive Adhesive A" was fed to the second feed port of the twin screw extruder through a first 51 mm single screw extruder (Bonnot). The Bonnot zone temperatures were set at the following: Zone 1=149° C. (300° F.), Zone 2=163° C. (325° F.), and Zone 3=177° C. (350° F.). The pump and heated hose were set at 177° C. (350° F.). A 30 mm co-rotating twin screw extruder (Werner

Materials

| Trade Name | Source | Description |
|---|---|---|
| IRGACURE 651 | Ciba Specialty Chemicals Corp, Tarrytown, NY | 2,2-dimethoxy-2-phenylacetophenone |
| F100D | Pierce Stevens, Buffalo, NY | expandable polymeric microspheres having a shell composition containing acrylonitrile and methacrylonitrile |
| EXACT 3024 | ExxonMobil Chemical Company, Houston, TX | ethylene-based butene plastomer, nominal tensile yield strength (machine direction (MD)) 5.5 MPa (800 psi), tensile break strength (MD) 50.3 MPa (7300 psi), elongation at break (MD) 400%, melt index (MI) 4.5, density 0.905 g/cm3, Peak Melting temperature 98° C. (208° F.) |
| EXACT 3040 | ExxonMobil Chemical Corporation, Houston, TX | ethylene-based hexene copolymer, nominal tensile yield strength (MD) 5.4 MPa (780 psi), tensile break strength (MD) 51.6 MPa (7490 psi), elongation at break (MD) 460%, MI 16.5, density 0.900 g/cm3, Peak Melting temperature 96° C. (205° F.). |
| ATTANE 4202 | The Dow Chemical Company, Midland, MI | ultra low density ethylene/octene copolymer, nominal tensile yield strength (MD) 8.98 MPa (1304 psi), tensile break strength (MD) 28.6 MPa (4146 psi), elongation at break (MD) 414%, MI 3.15, density 0.913 glcm3, DSC melting point 124° C. (255° F.). |

Examples 1–10

In these examples, three layer articles were prepared, each having a pressure sensitive skin adhesive layer on both outer surfaces of a polymer foam material. The polymer foam material contained microfibers generated in situ. The articles were prepared and tested for stretch release and adhesive performance.

Pfleider) operating at a screw speed of 300 rpm was used to precompound adhesive "A". The temperature for the six zones in the twin screw extruder was set at Zone 1=163° C. (325° F.), and Zones 2 through 6=121° C. (350° F.). The adhesive was delivered into a silicone coated paper box though a heated hose set at 121° C. (350° F.). The skin adhesive was identified as "Precompounded Skin Adhesive A."

Preparation of Stretch Releasable Foam Three Layer Article:

Microfiber forming resin of the type and in the amount specified in Table 1 was added as a dry solid to the first feed port of a 30 mm co-rotating twin screw extruder with three additive ports (Werner Pfleider) operating at a screw speed of 200 rpm. The microfiber forming resin feed rate adjusted to give the desired amount or weight percent based on the flow rate of the "Packaged Pressure Sensitive Adhesive A" which was set at about 7 pounds/hour (3.18 kilograms/hour). The temperature for all of the six zones in the twin screw extruder was set at 93.3° C. (200° F.). The temperatures in the extruder adaptor was set at 135° C. (275° F.) and the flexible hose at the exit end of the extruder was set at 171.1° C. (340° F.). The flow rate was controlled with a Zenith gear pump.

"Packaged Pressure Sensitive Adhesive A" was fed to the second feed port of the twin screw extruder through a first 51 mm single screw extruder (Bonnot) having the same zone temperatures as stated in "Preparation of Precompounded Skin Adhesive A" and at the above specified flow rate of about 7 pounds/hour (3.18 kilograms/hour).

F100D expandable polymeric microspheres in the amount specified in Table 1 were added downstream to the third feed port about three-fourths of the way down the extruder barrel before a conveying zone to uniformly mix the microspheres into "Packaged Pressure Sensitive Adhesive A". The extrudate was pumped via the heated hose to the center/middle layer of an about 203.2 mm (8 inches) wide CLOEREN multi-layer feedblock and die (available from The Cloeren Company, Orange, Tex.) with a gap of about 1 mm (0.04 inches). The die temperatures were set at 193.3° C. (380° F.).

Simultaneously, "Precompounded Skin Adhesive A" was fed to the each of the outer layers of the multilayer feedblock and die from a second 51 mm single screw extruder (Bonnot) and coextruded with the extrudate above to form the skin adhesive layers. The Bonnot three zone temperatures were all set at 149° C. (300° F.). The pump and heated hose were set at 163° C. (325° F.). The flow rate was adjusted to provide the thickness of each skin adhesive layer of about 0.05–0.1 mm (2–4 mils).

The resulting three layer sheet had a thickness of from about 0.94 mm (37 mils) to about 1.19 mm (47 mils). The extruded sheet was cast onto a chill roll that was set at 7.2° C., cooled to about 25° C., and then transferred onto a 0.127 mm thick polyethylene release liner of Examples 10a and 10b of U.S. patent application Ser. No. 09/775,955 and wound into a roll for subsequent crosslinking. An approximate 0.914 m (3 feet) long sample was cut from the roll. A polyester release liner was applied to the exposed adhesive layer. The extruded sheet was then crosslinked using an electron beam processing unit (ESI Electro Curtain) operating at an accelerating voltage of 300 keV and at a speed of 6.1 meters per minute. The measured e-beam dose was about 6 megaRads on each side.

TABLE 1

| Ex. No. | Parts F100D per 100 Parts of "A"[1] | Microfiber Resin | Wt. % Microfiber Resin |
|---|---|---|---|
| 1 | 1.5 | EXACT 3040 | 5.0 |
| 2 | 1.5 | EXACT 3040 | 30 |
| 3 | 1.5 | EXACT 3040 | 40 |
| 4 | 1.5 | EXACT 3040 | 50 |
| 5 | 0.75 | EXACT 3040 | 55 |
| 6 | 3.0 | EXACT 3040 | 2.5 |
| 7 | 0.75 | EXACT 3040 | 50 |
| 8 | 1.5 | EXACT 3024 | 30 |
| 9 | 1.5 | EXACT 3024 | 40 |
| 10 | 1.5 | ATTANE 4202 | 30 |

[1]A = Packaged Pressure Sensitive Adhesive A

The resultant article was then tested for tensile break strength, elongation, yield strength, modulus, foam split strength, hardness, and stretch release. Results are given in Table 2.

TABLE 2

| Ex. No. | Yield Strength MPa (psi) | Tensile Break Strength MPa (psi) | Elongation % | Modulus Mpa (psi) | Foam Split Strength, kN/m (piw) | Hardness | Stretch Release Rep 1/Rep 2 |
|---|---|---|---|---|---|---|---|
| 1 | 0.165 (24.0) | 0.23 (34) | 1284 | 0.21 (30) | 5.74 (32.6) FS[a] | 19.9 | broke/broke |
| 2 | 0.62 (90.0) | 2.27 (330) | 696 | 2.39 (347) | 0.65 (3.7) ARF[b] | 43.0 | broke/broke |
| 3 | 1.19 (173.0) | 3.20 (464) | 643 | 4.37 (635) | 0.21 (1.2) ARF | 56.1 | Broke/pulled out, 30% skin adhesive left on panel |
| 4 | 1.38 (200.0) | 3.70 (537) | 585 | 7.41 (1076) | 0.21 (1.2) ARF | 62.7 | broke/broke |
| 5 | 1.65 (239.0) | 6.46 (937) | 877 | 9.56 (1388) | NT[c] | 69.6 | both pulled out, 60% skin adhesive -left on panel |
| 6 | 0.176 (25.5) | 0.72 (104) | 1086 | 0.54 (78) | 6.35 (36.1) FS | 26.0 | broke/broke |
| 7 | 1.65 (240.0) | 6.35 (921) | 922 | 8.51 (1235) | 0.21 (1.2) ARF | 68.4 | both pulled out, 95% skin adhesive left on panel |

TABLE 2-continued

| Ex. No. | Yield Strength MPa (psi) | Tensile Break Strength MPa (psi) | Elongation % | Modulus, Mpa (psi) | Foam Split Strength, kN/m (piw) | Hardness | Stretch Release Rep 1/Rep 2 |
|---|---|---|---|---|---|---|---|
| 8 | 0.63 (92.0) | 2.23 (323) | 719 | 2.32 (336) | 2.90 (16.5) ARF | 39.4 | broke/broke |
| 9 | 0.92 (133.0) | 2.89 (420) | 700 | 3.87 (562) | 0.65 (3.7) ARF | 47.6 | broke/broke |
| 10 | 0.57 (83.0) | 1.80 (261) | 777 | 2.16 (313) | 3.82 (21.7) ARF | 35.5 | broke/broke |

(a)FS = foam split
(b)ARF = adhesive release of the foam to the adhesive layer
(c)NT = not tested Where the foam sample pulled out from between the test panels, skin adhesive remained on one or both panels after stretch release testing (Examples 3, 5, and 7). A small percent (about 10% or less) of skin adhesive residue was due to the microfibers terminating at the end of the sample. This mechanism is an alternate stretch release method of separating two substrates whereby the skin adhesive may be removed in an additional step.

Examples 11–20

Ten samples of three layer articles were prepared in Examples 1–10, each article having a pressure sensitive adhesive layer on both outer surfaces of a microfiber containing polymer foam material.

Preparation of Packaged Pressure Sensitive Adhesive B:

A packaged pressure-sensitive adhesive composition was prepared in the same manner as Packaged Pressure Sensitive Adhesive A except that 95 parts of 2-EHA, 5 parts of AA, and 0.01 parts IOTG were used in place of 90 parts of 2-EHA, 10 parts of AA, and 0.03 parts IOTG to form "Packaged Pressure Sensitive Adhesive B".

Preparation of Stretch Releasable Foam Three Layer Article:

Microfiber forming resin of the type and in the amount specified in Table 3 was added a dry solid to the first feed port of a 30 mm co-rotating twin screw extruder with three additive ports (Werner Pfleider) using the same processing equipment and processing conditions of Examples 1–10, Preparation of Stretch Releasable Foam Three Layer Article.

"Packaged Pressure Sensitive Adhesive B" was fed to the second feed port of the twin screw extruder through a first 51 mm single screw extruder (Bonnot).

F100D expandable polymeric microspheres were added downstream to the third feed port about three-fourths of the way down the extruder barrel in the same manner as for Examples 1–10 except that the amount of microspheres was based on 100 parts of "Packaged Pressure Sensitive Adhesive B".

Simultaneously, "Precompounded Skin Adhesive A" was fed to the each of the outer layers of the three layer drop die using the same processing equipment and processing conditions as Examples 1–10, Preparation of Stretch Releasable Foam Three Layer Article to form the skin adhesive layers.

The extruded sheet was cast onto a chill roll and subsequently crosslinked using the same processing equipment and processing conditions as Examples 1–10, Preparation of Stretch Releasable Foam Three Layer Article.

TABLE 3

| Ex. No. | Parts F100D per 100 Parts of "B"(1) | Microfiber Resin | Wt. % Microfiber Resin |
|---|---|---|---|
| 11 | 1.5 | EXACT 3040 | 30 |
| 12 | 1.5 | EXACT 3040 | 40 |
| 13 | 1.5 | EXACT 3040 | 50 |
| 14 | 1.5 | EXACT 3024 | 30 |
| 15 | 1.5 | EXACT 3024 | 40 |
| 16 | 1.5 | ATTANE 4202 | 30 |
| 17 | 2.5 | EXACT 3040 | 30 |
| 18 | 2.5 | EXACT 3040 | 40 |
| 19 | 2.5 | EXACT 3040 | 50 |
| 20 | 0.75 | EXACT 3040 | 55 |

(1)B = Packaged Pressure Sensitive Adhesive B

The resultant article was then tested for tensile break strength, elongation, yield strength, modulus, foam split strength, hardness, and stretch release. Results are given in Table 4.

TABLE 4

| Ex. No. | Yield Strength MPa (psi) | Tensile Break Strength MPa (psi) | Elongation, % | Modulus, Mpa (psi) | Foam Split Strength, kN/m (piw) | Hardness | Stretch Release Rep 1/Rep 2 |
|---|---|---|---|---|---|---|---|
| 11 | 0.50 (72.0) | 1.38 (200) | 733 | 2.09 (303) | 1.30 (7.4) ARF(b) | 30.7 | broke/broke |
| 12 | 0.88 (128.0) | 2.78 (404) | 675 | 5.04 (731) | 0.32 (1.8) ARF(b) | 49.4 | broke/broke |
| 13 | 1.45 (210.0) | 5.62 (816) | 854 | 9.98 (1448) | 0.26 (1.5) ARF | 67.6 | both pulled out, 50% skin left on panel |

TABLE 4-continued

| Ex. No. | Yield Strength MPa (psi) | Tensile Break Strength MPa (psi) | Elongation, % | Modulus, Mpa (psi) | Foam Split Strength, kN/m (piw) | Hardness | Stretch Release Rep 1/Rep 2 |
|---|---|---|---|---|---|---|---|
| 14 | 0.52 (76.0) | 1.14 (166) | 825 | 1.67 (242) | 4.70 (26.7) ARF | 31.6 | broke/broke |
| 15 | 0.76 (110.0) | 1.86 (270) | 673 | 3.56 (517) | 3.12 (17.7) FS[a] | 40.8 | broke/broke |
| 16 | 0.45 (65.0) | 1.38 (200) | 870 | 2.06 (299) | 7.23 (41.1) ARF | 25.2 | broke/broke |
| 17 | 0.54 (78.0) | 1.74 (253) | 622 | 2.72 (395) | 1.04 (5.9) ARF | 33.0 | broke/broke |
| 18 | 0.98 (142.0) | 2.93 (425) | 686 | 5.06 (734) | 0.46 (2.6) ARF | 51.9 | both pulled out, 30% skin left on panel |
| 19 | 1.295 (188.0) | 4.15 (603) | 708 | 7.61 (1104) | 0.30 (1.7) ARF | 61.9 | both pulled out, 75% skin left on panel |
| 20 | 1.77 (257.0) | 6.21 (901) | 847 | 1.07 (1557) | 0.23 (1.3) ARF | 78.0 | both pulled out, 70% skin left on panel |

[a]FS = foam split
[b]ARF = adhesive release of the foam to the adhesive layer

Examples 21–24

Three samples of three layer articles were prepared in the following Examples 21–24. Each article included a pressure sensitive adhesive layer on both outer surfaces of a microfiber containing polymer foam material. The foam material for these articles was prepared using the process as in Examples 1–10.

Preparation of Packaged Pressure Sensitive Adhesive C:

A packaged pressure-sensitive adhesive composition was prepared in the same manner as Packaged Pressure Sensitive Adhesive A except that 97 parts of 2-EHA, 3 parts of AA, and 0.01 parts IOTG were used in place of 90 parts of 2-EHA, 10 parts of AA, and 0.03 parts IOTG to form "Packaged Pressure sensitive adhesive C".

Preparation of Stretch Releasable Foam Three Layer Article:

Microfiber forming resin of the type and in the amount specified in Table 5 was added a dry solid to the first feed port of a 30 mm co-rotating twin screw extruder with three additive ports (Werner Pfleider) using the same processing equipment and processing conditions of Examples 1–10, Preparation of Stretch Releasable Foam Three Layer Article.

"Packaged Pressure Sensitive Adhesive C" was fed to the second feed port of the twin screw extruder through a first 51 mm single screw extruder (Bonnot) using the same process conditions as in Preparation of Pressure Sensitive Adhesive A.

F100D expandable polymeric microspheres were added downstream to the third feed port about three-fourths of the way down the extruder barrel in the same manner as for Examples 1–10 except that the amount of microspheres was based on 100 parts of "Packaged Pressure Sensitive Adhesive C".

Simultaneously, "Precompounded Adhesive A" was fed to the each of the outer layers of the three layer drop die using the same processing equipment and processing conditions as Examples 1–10, Preparation of Stretch Releasable Foam Three Layer Article to form the skin adhesive layers.

The extruded sheet was cast onto a chill roll and subsequently crosslinked using the same processing equipment and processing conditions as Examples 1–10, Preparation of Stretch Releasable Foam Three Layer Article.

TABLE 5

| Ex. No. | Parts F100D per 100 Parts of "C"[1] | Microfiber Resin | Wt. % Microfiber Resin |
|---|---|---|---|
| 21 | 1.5 | EXACT 3040 | 30 |
| 22 | 1.5 | EXACT 3040 | 40 |
| 23 | 1.5 | EXACT 3040 | 50 |
| 24 | 1.5 | ATTANE 4202 | 30 |

[1]C = Packaged Pressure Sensitive Adhesive C

The article was then tested for tensile break strength, elongation, yield strength, modulus, foam split strength, hardness, and stretch release. Results are given in Table 6.

TABLE 6

| Ex. No. | Yield Strength MPa (psi) | Tensile Break Strength MPa (psi) | Elongation % | Modulus, Mpa (psi) | Foam Split Strength, kN/m (piw) | Hardness | Stretch Release Rep 1/Rep 2 |
|---|---|---|---|---|---|---|---|
| 21 | 0.37 (53.9) | 1.19 (173) | 746 | 1.81 (262) | 10.3 (58.8) FS[a] | 19.9 | broke/broke |
| 22 | 0.70 (101.4) | 2.14 (310) | 589 | 3.63 (527) | 2.38 (13.5) FS | 38.7 | broke/broke |

TABLE 6-continued

| Ex. No. | Yield Strength MPa (psi) | Tensile Break Strength MPa (psi) | Elongation % | Modulus, Mpa (psi) | Foam Split Strength, kN/m (piw) | Hardness | Stretch Release Rep 1/Rep 2 |
|---|---|---|---|---|---|---|---|
| 23 | 1.31 (189.6) | 3.42 (497) | 616 | 7.12 (1033) | 0.44 (2.5) ARF[b] | 57.9 | both pulled out, 30% skin left on panel |
| 24 | 0.30 (43.0) | 0.41 (59) | 1058 | 0.91 (132) | 10.2 (58.0) ARF | 20.0 | broke/broke |

[a]FS = foam split
[b]ARF = adhesive release of the foam to the adhesive layer

From the data it can be seen that the selection of the foam core polymer has an effect the properties of the foam article, such as yield strength, tensile break strength, modulus, and hardness. Examples 2 (90/10 2-EHA/AA), 11 (95/5 2-EHA/AA), and 21 (97/3 2-EHA/AA) differed only in the composition of foam polymer. As the amount of AA in the foam polymer increased, yield strength, tensile break strength, modulus, and hardness increased.

Examples 25–36

In each of these examples, a three layer article was prepared having a pressure sensitive adhesive layer on both outer surfaces of a polymer foam material containing microfibers generated in situ. Each article was tested for stretch release and adhesive performance. The foam material for these articles was prepared using the process of Examples 1–10 with the monomers and amounts specified in Table 7.

Precompounded Skin Adhesive D

"Precompounded Skin Adhesive D" was Hot Melt Composition K of PCT International Publication WO 01/57152 which was a blend of tackified acrylic adhesive and block copolymer rubber based adhesive.

Preparation of Stretch Releasable Foam Three Layer Article:

EXACT 3040 microfiber forming resin in the amount specified in Table 7 was added as a dry solid to the first feed port of a 30 mm co-rotating twin screw extruder with three additive ports (Werner Pfleider) operating at a screw speed of 200 rpm. The microfiber forming resin feed rate adjusted to give the desired amount or weight percent based on the flow rate of the "Packaged Pressure Sensitive Adhesive A" which was set at about 7 pounds/hour (3.18 kilograms/hour) of microfiber forming resin for Examples 25–29 and a flow rate of about 14 pounds/hour (6.36 kilograms/hour) of microfiber forming resin for Examples 30–36. The temperature for the six zones in the twin screw extruder were set at 37.5° C. (100° F.) for Zone 1, 99° C. (210° F.) for Zone 2, 104.4° C. (220° F.) for Zone 3, 110° C. (230° F.) for Zone 4, 115.6° C. (240° F.) for Zone 5, and 121° C. (250° F.) for Zone 6. The temperatures in the extruder adaptor was set at 135° C. (275° F.) and the flexible hose at the exit end of the extruder was set at 182.2° C. (360° F.). The flow rate was controlled with a Zenith gear pump.

For Examples 25–29, "Packaged Pressure Sensitive Adhesive A" of Examples 1–10 was fed to the second feed port of the twin screw extruder through a first 51 mm single screw extruder (Bonnot) at the above specified flow rate of about 7 pounds/hour (3.18 kilograms/hour). For Examples 30–36, "Packaged Pressure Sensitive Adhesive B" of Examples 11–20 was fed to the second feed port of the twin screw extruder through a first 51 mm single screw extruder (Bonnot) at the above specified flow rate of about 14 pounds/hour (6.36 kilograms/hour).

The temperature for all three zones in the Bonnot was set at 176.7° C. (350° F.).

F100D expandable polymeric microspheres in the amount specified in Table 7 were added downstream to the third feed port about three-fourths of the way down the extruder barrel before a conveying zone to uniformly mix the microspheres into "Packaged Pressure Sensitive Adhesive A" (Examples 25–29) or "Packaged Pressure Sensitive Adhesive B" (Examples 30–36).

The die temperatures were set at 182.2° C. (360° F.). The extrudate was pumped via the heated hose to the center/middle layer of an about 203.2 mm (8 inches) wide CLOEREN three layer die (available from The Cloeren Company, Orange, Tex.) with a gap of about 1 mm (0.04 inches).

Simultaneously, "Precompounded Skin Adhesive D" was fed to the each of the outer layers of the three layer die from a second 51 mm single screw extruder (Bonnot) to form the skin adhesive layers and was coextruded with the extrudate above. The temperatures for the three zones in the single screw extruder were set at 165.6° C. (330° F.) for Zone 1, 171.1° C. (340° F.) for Zone 2, and 176.7° C. (350° F.) for Zone 3.

The extruded sheet was cast onto a chill roll that was set at 7.2° C., cooled to about 25° C., and then transferred onto a 0.127 mm thick polyethylene release liner of Examples 10a and 10b of U.S. patent application Ser. No. 09/775,955 and wound into a roll for subsequent crosslinking. The extruded sheet was then crosslinked using an electron beam processing unit (ESI Electro Curtain) operating at an accelerating voltage of 300 keV and at a speed of 6.1 meters per minute. The measured e-beam dose was about 6 megaRads on both sides.

TABLE 7

| Ex. No. | Foam Composition | Parts F100D per 100 Parts of Foam Composition | Microfiber Resin | Wt. % Microfiber Resin |
|---|---|---|---|---|
| 25 | A(1) | 1.0 | EXACT 3040 | 35 |
| 26 | A | 1.0 | EXACT 3040 | 40 |
| 27 | A | 1.0 | EXACT 3040 | 45 |
| 28 | A | 1.0 | EXACT 3040 | 50 |
| 29 | B(2) | 1.0 | EXACT 3040 | 40 |
| 30 | B | 1.0 | EXACT 3040 | 40 |
| 31 | B | 2.0 | EXACT 3040 | 40 |
| 32 | B | 1.0 | EXACT 3040 | 37.5 |
| 33 | B | 1.0 | EXACT 3040 | 35.0 |
| 34 | B | 1.0 | EXACT 3040 | 32.5 |
| 35 | B | 1.0 | EXACT 3040 | 30 |
| 36 | B | 1.0 | EXACT 3040 | 25 |

(1)A = Packaged Pressure Sensitive Adhesive A
(2)B = Packaged Pressure Sensitive Adhesive B The resultant article was then tested for tensile break strength, elongation, yield strength, modulus, foam split strength, hardness, and stretch release. Results are given in Table 8.

TABLE 8

| Ex. No. | Yield Strength MPa (psi) | Tensile Break Strength MPa (psi) | Elongation % | Modulus, Mpa (psi) | Foam Split Strength, kN/m (piw) | Hardness | Stretch Release Rep 1/Rep 2 |
|---|---|---|---|---|---|---|---|
| 25 | 0.60 (87.5) | 2.40 (348) | 731 | 2.47 (359) | 1.41 (8.0) FS[a]** | 44.5 | on both half pulled out & broke |
| 26 | 1.08 (157.2) | 3.07 (446) | 587 | 4.07 (590) | 0.81 (4.6) FS | 55.3 | broke/25% skin left on panel |
| 27 | 1.44 (209.2) | 4.29 (622) | 667 | 7.38 (1071) | 1.99 (11.3) ARF[b] | 66.4 | both pulled out, 25% skin left on panel |
| 28 | 1.18 (171.5) | 3.42 (496) | 614 | 4.88 (708) | 3.31 (18.8) FS | 60.4 | both pulled out, 30% skin left on panel |
| 29 | NT[c] | 2.78 (403) | 605.7 | 5.62 (816) | ~1.14 (~6.5) FS | 52.0 | both pulled out |
| 30 | NT | 5.75 (834.6) | 389.5 | 8.48 (1230.2) | 2.80 (15.9) ARF | 62.6 | both pulled out, 10% skin left on panel |
| 31 | NT | 4.47 (649.3) | 359.5 | 6.12 (888.2) | 2.59 (14.69) ARF | 57.2 | both pulled out, 10% skin left on panel |
| 32 | NT | 3.31 (480.3) | 303.5 | 5.92 (858.7) | 3.08 (17.5) ARF | 56.9 | both pulled out, 15% skin left on panel |
| 33 | NT | 3.40 (494.0) | 334.6 | 5.39 (782.4) | 3.21 (18.22) ARF | 54.5 | both pulled out, 5% skin left on panel |
| 34 | NT | 3.04 (441.3) | 315.1 | 5.18 (752.5) | 4.08 (23.2) ARF | 52.9 | both pulled out, 10% skin left on panel |
| 35 | NT | 2.70 (391.6) | 300 | 4.24 (615.7) | 4.70 (26.69) ARF | 51.3 | both pulled out, 10% skin left on panel |
| 36 | NT | 2.27 (329.0) | 294.1 | 2.69 (391.0) | 2.90 (16.5) FS | 39.1 | both pulled out, 15% skin left on panel |

[a]FS = foam split
[b]ARF = adhesive release of the foam from the adhesive layer
[c]NT = not tested
**For this example, it was noted that the foam split into layers, failing cohesively. This could be used as a means to provide a stretch release foam article having high peel adhesive strength. The remaining portions would be removed by stretch release method.

Examples 16–18, 21–23, 25–26, 28, and 30–36

Samples of Examples 16–18, 21–23, 25–26, 28, and 30–36 were tested for peel adhesion to glass and stainless steel according to the above test method "90 Degree Peel Adhesion." In addition, the thickness of the skin adhesive layers and the foam matrix were measured. Results are reported in Table 9.

TABLE 9

| | Thickness, mm (mils) | | | 90 Degree Peel Adhesion, kN/m (piw), Failure Mode, % Contact | |
|---|---|---|---|---|---|
| Ex. No. | Skin Adhesive Side 1 | Foam Core | Skin Adhesive Side 2 | Glass | Stainless Steel |
| 16 | 0.064 (2.50) | 0.855 (33.65) | 0.061 (2.40) | 3.28 (18.65) AR(a), 100% contact | 1.74 (9.90) AR |
| 17 | 0.025 (1.0) | 0.856 (33.70) | <0.025 (<1.0) | 0.42 (2.39) AR, 80% contact | 0.21 (1.19) AR |
| 18 | 0.068 (2.70) | 1.027 (40.45) | 0.043 (1.70) | 0.46 (2.64) AR, 90% contact | 0.40 (2.25) AR |

TABLE 9-continued

| | Thickness, mm (mils) | | | 90 Degree Peel Adhesion, kN/m (piw), Failure Mode, % Contact | |
|---|---|---|---|---|---|
| | Skin Adhesive | | Skin Adhesive | | |
| Ex. No. | Side 1 | Foam Core | Side 2 | Glass | Stainless Steel |
| 21 | 0.072 (2.85) | 0.686 (27.0) | 0.086 (3.40) | 4.17 (23.67) 85% AR, 15% FS[b], 100% contact | 2.77 (15.72) AR |
| 22 | 0.075 (2.95) | 0.838 (33.0) | 0.077 (3.05) | 2.53 (14.36) FS, 100% contact | 2.54 (14.46) FS |
| 23 | 0.099 (3.9) | 1.01 (39.7) | 0.064 (2.5) | 0.90 (5.14) 65% AR, 35% ARF[c], 85 % contact | 0.46 (2.59) 90% AR, 10% ARF |
| 25 | 0.095 (3.75) | 0.80 (31.5) | 0.056 (2.2) | 1.78 (10.09) 30% AR, 70% FS, 100% contact | 1.44 (8.16) 70% AR, 30% FS |
| 26 | 0.086 (3.40) | 0.886 (34.9) | 0.061 (2.4) | 0.98 (5.59) 80% AR, 20% ES, 60% contact | 0.54 (3.05) AR |
| 28 | 0.086 (3.40) | 0.808 (31.8) | 0.064 (2.5) | 0.51 (2.89) AR, 50% contact | 1.36 (7.75) AR |
| 30 | 0.152 (6.0) | 0.646 (25.45) | 0.128 (5.05) | 0.94 (5.34) AR, 70% contact | 0.77 (4.37) AR |
| 31 | 0.138 (5.45) | 0.693 (27.3) | 0.105 (4.15) | 0.96 (5.46) AR 60% contact | 0.72 (4.11) AR |
| 32 | 0.227 (8.95) | 0.753 (29.65) | 0.180 (7.1) | 1.15 (6.51) AR, 80% contact AR | 2.23 (12.65) |
| 33 | 0.212 (8.35) | 0.658 (25.9) | 0.166 (6.55) | 1.97 (11.2) AR, 80% contact AR | 1.87 (10.60) |
| 34 | 0.234 (9.2) | 0.705 (27.75) | 0.184 (7.25) | 2.21 (12.56) AR, 90% contact | 1.54 (8.75) AR |
| 35 | 0.232 (9.15) | 0.646 (25.45) | 0.208 (8.2) | 2.25 (12.76) AR, 95% contact | 1.87 (10.63) AR |
| 36 | 0.194 (7.65) | 0.537 (21.15) | 0.155 (6.1) | 1.73 (9.84) AR, 100% contact | 1.58 (8.95) AR |

[a]AR = adhesive release from substrate
[b]ES = foam split
[c]ARF = adhesive release of the foam from the adhesive layer It is generally desirable to provide the foam articles of the invention with outer surfaces that are smooth in order to maximize the contact and to maximize adhesion between the foam article and any substrate to which the article is adhered. For the samples of Examples 30–36, it was noted that the Shore A hardness decreased (i.e., softness increased), and the % contact increased. The tensile break strength, yield strength, and modulus were affected by the thickness of the foam core. While the total thickness of the foam article is used to calculate the aforementioned values, variability of the thickness of the foam core has a greater influence than variability of the thickness of the skin adhesive.

While the features of the preferred embodiments of the invention have been discussed and described in detail, it will be appreciated that various modifications to the described embodiments are within the skill of those in the art, and such modifications and changes are within the scope and spirit of the invention as set forth further in the appended claims.

We claim:

1. A foam adhesive article, comprising:
   A polymeric foam material having an outer surface, the outer surface of the polymeric foam material having adhesive properties; and
   Fibrous reinforcing material dispersed throughout the polymeric foam material, the fibrous reinforcing material consisting essentially of fibrous material that is oriented in the machine direction and imparting stretch release properties to the article; and
   the foam article having a Shore A hardness of less than about 60, a tensile break strength of at least about 150% of the yield strength of the article, and an elongation at break of greater than about 200%.

2. The foam adhesive article of claim 1 wherein the foam article has a foam split strength greater than about 1.76 kN/m (10 lbs/inch), and a 90 degree adhesion to glass or stainless steel of greater than about 1.76 kN/m (10 lbs/inch).

3. The foam adhesive article of claim 1 further comprising a tab.

4. The foam adhesive article of claim 1 wherein the polymeric foam material is a sheet and the outer surface comprises a first major surface and a second major surface, an adhesive layer disposed on at least a portion of one of the first major surface or second major surface to provide the adhesive properties.

5. The foam adhesive article of claim 2 wherein a first adhesive layer is disposed on at least a portion of the first major surface and a second adhesive layer is disposed on at least a portion of the second major surface.

6. The foam adhesive article of claim 1 wherein the fibrous reinforcing material comprises substantially continuous viscoelastic fibers.

7. The foam adhesive article of claim 1 wherein the fibrous reinforcing material comprises substantially continuous elastic fibers having greater than about 50% recovery after being elongated 100%.

8. The foam adhesive article of claim 1 wherein the fibrous reinforcing material comprises at least one fiber having a diameter of less than about 5 micrometers.

9. The foam adhesive article of claim 1 wherein the fibrous reinforcing material comprise elastic microfibers comprising thermoplastic elastomers.

10. The foam adhesive article of claim 1 wherein the fibrous reinforcing material comprise viscoelastic microfibers comprising a copolymer of polyoctene and ethylene.

11. The foam adhesive article of claim 1 further comprising a plurality of expandable polymeric microspheres.

12. The foam adhesive article according to claim 1 wherein the polymeric foam material comprises material selected from the group consisting of elastomers, rubbers, thermoplastic elastomers, rubber based and acrylic adhesives, polyolefin polymers, acrylate polymers and methacrylate polymers, acrylate and methacrylate copolymers, and combinations thereof.

13. The foam adhesive article of claim 1 wherein the polymeric foam material is a pressure sensitive adhesive.

14. The foam adhesive article of claim 1 further comprising a pressure sensitive adhesive associated with the outer surface, the adhesive comprising material selected from the group consisting of acrylic polymers, polyurethanes, thermoplastic elastomers, block copolymers, polyolefins, silicones, rubber based adhesives , a copolymer of ethylhexyl acrylate and acrylic acid, a copolymer of isooctyl acrylate and acrylic acid, a blend of an acrylic adhesive and rubber based adhesive, and combinations of the foregoing.

15. A method for preparing a foam adhesive article, comprising:
 (a) melt mixing a foamable polymer composition, a foaming agent, and a fiber forming resin to form an expandable extrudable composition; and
 (b) extruding the expandable extrudable composition through a die to provide a foam adhesive article according to claim 1.

16. The method according to claim 15 wherein the foaming agent comprises a plurality of expandable microspheres, a chemical blowing agent, a high pressure injectable gas, or combinations thereof.

17. A method according to claim 15, further comprising (c) applying an adhesive onto at least a portion of the outer surface of the foam.

18. A method according to claim 15, further comprising (d) exposing the expandable extrudable composition to radiation to crosslink the composition and provide the foam.

19. A method according to claim 15 wherein the fiber forming resins comprise homopolymers, copolymers, terpolymers, and tetrapolymers of materials selected from the group consisting of ethylene, propylene, butene, pentene, hexene, heptene, octene, nonene, decene, vinyl acetate, acrylates, methacrylates, thermoplastic elastomers, and combinations of the foregoing.

20. The article of claim 1 in the form of a tape constructed to stretch release from between a pair of rigid panels.

* * * * *

UNITED STATES PATENT AND TRADEMARK OFFICE
CERTIFICATE OF CORRECTION

PATENT NO. : 7,063,887 B2
APPLICATION NO. : 10/067047
DATED : May 31, 2006
INVENTOR(S) : James J. Kobe It is certified that error appears in the above-identified patent and that said Letters Patent is hereby corrected as shown below:

Column 6 – Line 15 - Delete "isobomyl" and insert -- isobornyl --, therefor.

Column 31-32 – Line 17 (Table 9-continued) - Delete "ES," and insert -- FS, --, therefor.

Column 31-32 – Line 25 (Table 9-continued) - After "(12.65)" insert -- AR --.

Column 31-32 – Line 26 (Table 9-continued) - After "contact" delete "AR".

Column 31-32 – Line 27 (Table 9-continued) - After "(10.60)" insert -- AR --.

Column 31-32 – Line 2 (Below Table 9) - Delete "$^{(b)}$ES" and insert -- $^{(b)}$FS --, therefor.

Signed and Sealed this

Nineteenth Day of September, 2006

JON W. DUDAS
*Director of the United States Patent and Trademark Office*

UNITED STATES PATENT AND TRADEMARK OFFICE
CERTIFICATE OF CORRECTION

PATENT NO. : 7,063,887 B2  
APPLICATION NO. : 10/067047  
DATED : June 20, 2006  
INVENTOR(S) : James J. Kobe Page 1 of 1

It is certified that error appears in the above-identified patent and that said Letters Patent is hereby corrected as shown below:

Column 6 – Line 15 - Delete "isobomyl" and insert -- isobornyl --, therefor.

Column 31-32 – Line 17 (Table 9-continued) - Delete "ES," and insert -- FS, --, therefor.

Column 31-32 – Line 25 (Table 9-continued) - After "(12.65)" insert -- AR --.

Column 31-32 – Line 26 (Table 9-continued) - After "contact" delete "AR".

Column 31-32 – Line 27 (Table 9-continued) - After "(10.60)" insert -- AR --.

Column 31-32 – Line 2 (Below Table 9) - Delete ""$^{(b)}$ES" and insert -- $^{(b)}$FS --, therefor.

This certificate supersedes Certificate of Correction issued September 19, 2006.

Signed and Sealed this

Seventh Day of November, 2006

JON W. DUDAS  
*Director of the United States Patent and Trademark Office*